United States Patent
Heikkila et al.

(10) Patent No.: US 11,767,409 B2
(45) Date of Patent: *Sep. 26, 2023

(54) REDUCED DENSITY HOLLOW GLASS MICROSPHERE POLYMER COMPOSITE

(71) Applicant: Tundra Composites, LLC, White Bear Lake, MN (US)

(72) Inventors: Kurt Heikkila, Marine on the St. Croix, MN (US); Rodney Williams, Stacy, MN (US); John Kroll, Blaine, MN (US)

(73) Assignee: Tundra Composites, LLC, White Bear Lake, MN (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/226,282

(22) Filed: Apr. 9, 2021

(65) Prior Publication Data
US 2021/0301100 A1   Sep. 30, 2021

Related U.S. Application Data

(63) Continuation of application No. 16/546,831, filed on Aug. 21, 2019, now abandoned, which is a
(Continued)

(51) Int. Cl.
*C08K 3/22* (2006.01)
*B60C 1/00* (2006.01)
*C08K 7/28* (2006.01)
*C08K 9/04* (2006.01)
*C08L 21/00* (2006.01)
(Continued)

(52) U.S. Cl.
CPC ............... *C08K 3/22* (2013.01); *B60C 1/00* (2013.01); *C08J 5/04* (2013.01); *C08K 7/28* (2013.01); *C08K 9/00* (2013.01); *C08K 9/04* (2013.01); *C08L 21/00* (2013.01); *C08J 2327/16* (2013.01); *C08J 2327/18* (2013.01); *C08J 2327/20* (2013.01); *C08K 2003/2227* (2013.01);
(Continued)

(58) Field of Classification Search
CPC .................................. C08K 3/22; B60C 1/00
USPC ........................................................ 524/494
See application file for complete search history.

(56) References Cited

U.S. PATENT DOCUMENTS 2,429,032 A  10/1947  Sheahan
2,723,238 A  11/1955  Simpkiss, Jr.
(Continued)

FOREIGN PATENT DOCUMENTS

CA    1043393 A1   11/1978
CN    1742045 A    3/2006
(Continued)

OTHER PUBLICATIONS

Bose et al., "Effect of Flash on the Mechanical, Thermal, Dielectric, Rheological and Morphological Properties of Filled Nylon 6," Journal of Minerals & Materials Characterization & Engineering, vol. 3, No. 2, pp. 65-72 (2004).
(Continued)

*Primary Examiner* — Arrie L Reuther
(74) *Attorney, Agent, or Firm* — Mark DiPietro; Fred Morgan

(57) ABSTRACT

The invention relates to a hollow glass microsphere and polymer composite having enhanced viscoelastic and rheological properties.

15 Claims, 5 Drawing Sheets

Figure 1:
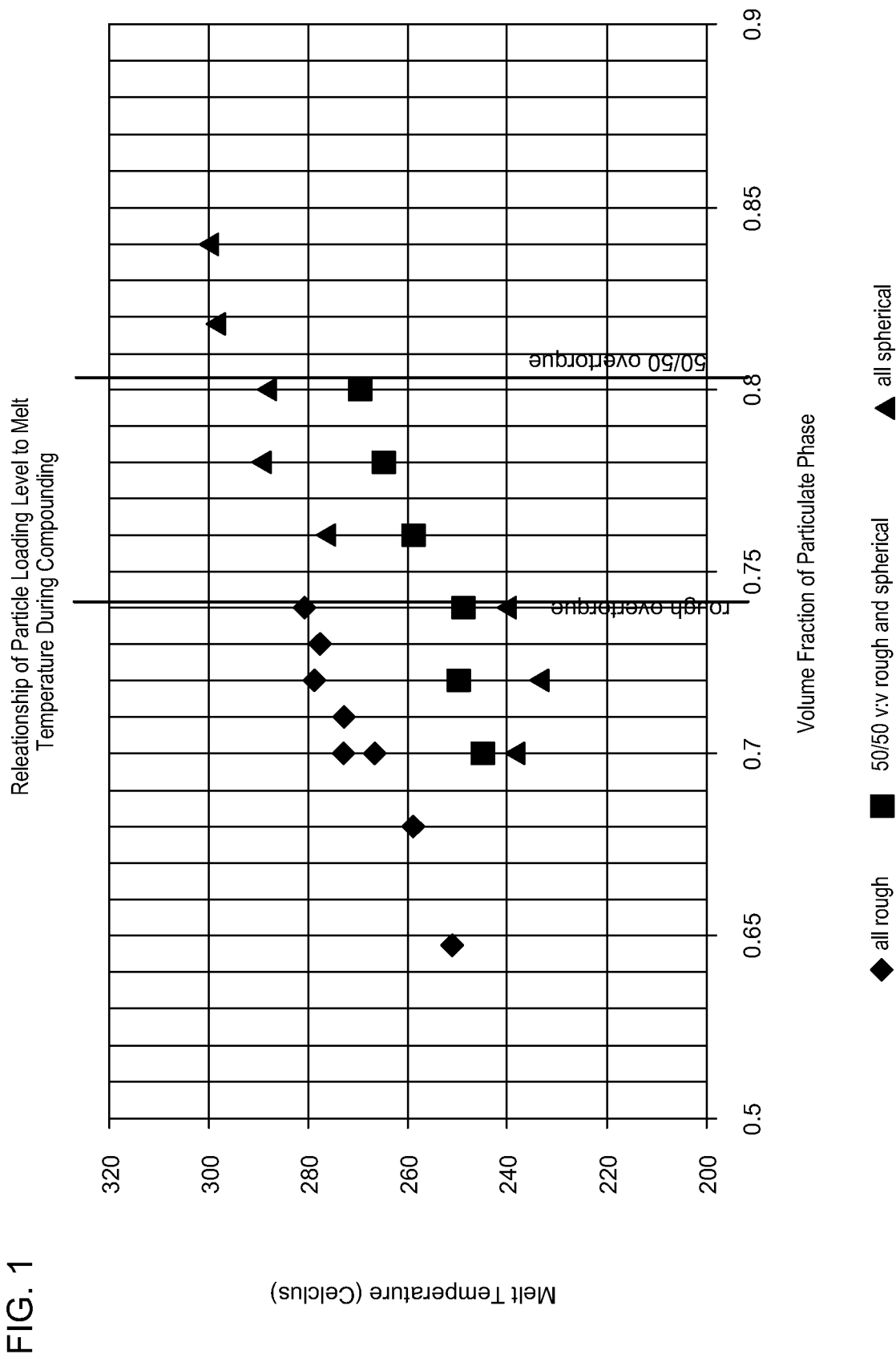

Related U.S. Application Data continuation of application No. 15/680,835, filed on Aug. 18, 2017, now abandoned, which is a continuation of application No. 14/965,997, filed on Dec. 11, 2015, now Pat. No. 9,771,463, which is a continuation of application No. 12/769,553, filed on Apr. 28, 2010, now Pat. No. 9,249,283.

(60) Provisional application No. 61/173,791, filed on Apr. 29, 2009.

(51) Int. Cl.
*C08K 9/00* (2006.01)
*C08J 5/04* (2006.01)

(52) U.S. Cl.
CPC .................. C08K 2201/005 (2013.01); Y10T 428/249974 (2015.04)

(56) References Cited

U.S. PATENT DOCUMENTS

| | | | |
|---|---|---|---|
| 2,723,239 A | 11/1955 | Harvey |
| 2,748,099 A | 5/1956 | Bruner et al. |
| 2,879,667 A | 3/1959 | Henderson |
| 2,909,060 A | 10/1959 | Branick |
| 2,958,165 A | 11/1960 | Hofmann |
| 2,968,649 A | 1/1961 | Pailthorp et al. |
| 2,995,788 A | 8/1961 | Sunday |
| 3,002,388 A | 10/1961 | Bageman |
| 3,137,045 A | 6/1964 | Sunday |
| 3,177,039 A | 4/1965 | Skidmore |
| 3,178,399 A | 4/1965 | Lo |
| 3,289,483 A | 12/1966 | Slemmons |
| 3,326,051 A | 6/1967 | Bageman et al. |
| 3,365,315 A | 1/1968 | Beck et al. |
| 3,379,057 A | 4/1968 | Hegenbart |
| 3,382,908 A | 5/1968 | Palmquist et al. |
| 3,424,127 A | 1/1969 | Johnson et al. |
| 3,452,799 A | 7/1969 | Hindin et al. |
| 3,474,677 A | 10/1969 | Roe |
| 3,478,603 A | 11/1969 | Bonessa |
| 3,493,257 A | 2/1970 | Fitzgerald et al. |
| 3,616,126 A | 10/1971 | Tungseth |
| 3,616,127 A | 10/1971 | Guenther |
| 3,619,456 A | 11/1971 | Taylor, Jr. |
| 3,623,208 A | 11/1971 | Hofmann |
| 3,663,328 A | 5/1972 | Turoczi, Jr. |
| 3,669,500 A | 6/1972 | Ende |
| 3,688,380 A | 9/1972 | Hofmann et al. |
| 3,716,927 A | 2/1973 | Carter |
| 3,740,257 A | 6/1973 | Roscher |
| 3,741,016 A | 6/1973 | Hofmann |
| 3,748,910 A | 7/1973 | Hofmann |
| 3,786,850 A | 1/1974 | Turoczi, Jr. |
| 3,793,656 A | 2/1974 | Carter et al. |
| 3,843,591 A | 10/1974 | Hedrick et al. |
| 3,894,169 A | 7/1975 | Miller |
| 3,895,143 A | 7/1975 | Tarlow |
| 3,901,845 A | 8/1975 | Newbould |
| 3,905,648 A | 9/1975 | Skidmore |
| 3,918,141 A | 11/1975 | Pepper et al. |
| 3,953,566 A | 4/1976 | Gore |
| 3,960,409 A | 6/1976 | Songer |
| 4,022,748 A | 5/1977 | Schlichting et al. |
| 4,040,760 A | 8/1977 | Wyckoff |
| 4,157,325 A | 6/1979 | Charles et al. |
| 4,168,259 A | 9/1979 | Coleman |
| 4,169,185 A | 9/1979 | Bhatia |
| 4,173,930 A | 11/1979 | Faires et al. |
| 4,178,277 A | 12/1979 | Gebauer et al. |
| 4,187,390 A | 2/1980 | Gore |
| 4,224,267 A | 9/1980 | Lugosi et al. |
| 4,232,979 A | 11/1980 | Johnson et al. |
| 4,257,699 A | 3/1981 | Lentz |
| 4,335,180 A | 6/1982 | Traut |
| 4,340,319 A | 7/1982 | Johnson et al. |
| 4,418,186 A | 11/1983 | Yamabe et al. |
| 4,569,978 A | 2/1986 | Barber |
| 4,598,001 A | 7/1986 | Watanabe et al. |
| 4,614,629 A | 9/1986 | Economy |
| 4,740,538 A | 4/1988 | Sekutowski |
| 4,780,981 A | 11/1988 | Hayward et al. |
| 4,793,616 A | 12/1988 | Fernandez |
| 4,886,689 A | 12/1989 | Kotliar et al. |
| 4,891,399 A | 1/1990 | Ohkawa et al. |
| 4,949,645 A | 8/1990 | Hayward et al. |
| 5,017,432 A | 5/1991 | Eddy et al. |
| 5,019,311 A | 5/1991 | Koslow |
| 5,026,748 A | 6/1991 | Adams et al. |
| 5,061,965 A | 10/1991 | Ferguson et al. |
| 5,073,320 A | 12/1991 | Sterzel |
| 5,073,444 A | 12/1991 | Shanelec et al. |
| 5,130,342 A | 7/1992 | McAllister et al. |
| 5,141,273 A | 8/1992 | Freeman |
| 5,147,722 A | 9/1992 | Koslow |
| 5,198,295 A | 3/1993 | Arthur et al. |
| 5,210,113 A | 5/1993 | Waters |
| 5,214,106 A | 5/1993 | Carlson et al. |
| 5,237,930 A | 8/1993 | Belanger et al. |
| 5,265,925 A | 11/1993 | Cox et al. |
| 5,278,219 A | 1/1994 | Lilley |
| 5,286,802 A | 2/1994 | Uesugi et al. |
| 5,289,997 A | 3/1994 | Harris |
| 5,342,573 A | 8/1994 | Amano et al. |
| 5,354,611 A | 10/1994 | Arthur et al. |
| 5,373,047 A | 12/1994 | Schnelle et al. |
| 5,378,407 A | 1/1995 | Chandler et al. |
| 5,384,345 A | 1/1995 | Naton |
| 5,399,187 A | 3/1995 | Mravic et al. |
| 5,418,293 A | 5/1995 | Numa et al. |
| 5,506,049 A | 4/1996 | Swei et al. |
| 5,548,125 A | 8/1996 | Sandbank |
| 5,591,279 A | 1/1997 | Midorikawa et al. |
| 5,594,186 A | 1/1997 | Krause et al. |
| 5,616,642 A | 4/1997 | West et al. |
| 5,620,775 A | 4/1997 | LaPerre |
| 5,631,053 A | 5/1997 | Andersen et al. |
| 5,639,838 A | 6/1997 | Albano et al. |
| 5,660,903 A | 8/1997 | Andersen et al. |
| 5,674,930 A | 10/1997 | Sugiura |
| 5,696,216 A | 12/1997 | Kruger et al. |
| 5,705,242 A | 1/1998 | Andersen et al. |
| 5,712,003 A | 1/1998 | Suenaga et al. |
| 5,786,416 A | 7/1998 | Gardner et al. |
| 5,866,647 A | 2/1999 | Massey et al. |
| 5,877,437 A | 3/1999 | Oltrogge |
| 5,922,453 A | 7/1999 | Horn, III et al. |
| 5,959,205 A | 9/1999 | Yamaya et al. |
| 6,048,379 A | 4/2000 | Bray et al. |
| 6,074,576 A | 6/2000 | Zhao et al. |
| 6,090,313 A | 7/2000 | Zhao |
| 6,128,952 A | 10/2000 | LeBlanc |
| 6,168,226 B1 | 1/2001 | Wycech |
| 6,177,533 B1 | 1/2001 | Woodward |
| 6,180,037 B1 | 1/2001 | Andersen et al. |
| 6,196,863 B1 | 3/2001 | Schwant |
| 6,204,971 B1 | 3/2001 | Morris et al. |
| 6,217,413 B1 | 4/2001 | Christianson |
| 6,270,549 B1 | 8/2001 | Amick |
| 6,308,999 B1 | 10/2001 | Tan et al. |
| 6,318,775 B1 | 11/2001 | Heatherington et al. |
| 6,346,565 B1 | 2/2002 | Daifuku et al. |
| 6,364,421 B1 | 4/2002 | Pursley |
| 6,364,422 B1 | 4/2002 | Sakaki et al. |
| 6,371,532 B1 | 4/2002 | Skarie et al. |
| 6,406,078 B1 | 6/2002 | Wycech |
| 6,411,248 B1 | 6/2002 | Barbour et al. |
| 6,413,626 B1 | 7/2002 | Wollner |
| 6,457,417 B1 | 10/2002 | Beal |
| 6,482,519 B1 | 11/2002 | Schleifstein |
| 6,514,595 B1 | 2/2003 | Sprouts |
| 6,515,066 B2 | 2/2003 | Allen et al. |
| 6,517,774 B1 | 2/2003 | Bray et al. |

(56) References Cited

U.S. PATENT DOCUMENTS

| | | |
|---|---|---|
| 6,525,125 B1 | 2/2003 | Giardello et al. |
| 6,553,831 B1 | 4/2003 | Schmidt et al. |
| 6,562,290 B2 | 5/2003 | Meinhardt et al. |
| 6,576,697 B1 | 6/2003 | Brown, Jr. |
| 6,578,431 B2 | 6/2003 | Dillard et al. |
| 6,623,849 B2 | 9/2003 | Meguro et al. |
| 6,672,635 B2 | 1/2004 | Weissenborn et al. |
| 6,695,366 B2 | 2/2004 | Cherry |
| 6,727,339 B2 | 4/2004 | Luginsland et al. |
| 6,740,260 B2 | 5/2004 | McCord |
| 6,815,066 B2 | 11/2004 | Elliott |
| 6,815,484 B2 | 11/2004 | Scholl et al. |
| 6,821,474 B2 | 11/2004 | Lauf et al. |
| 6,838,536 B2 * | 1/2005 | Wang .................. C08F 290/064 524/832 |
| 6,849,338 B2 | 2/2005 | Clemens et al. |
| 6,866,313 B2 | 3/2005 | Mooijman et al. |
| 6,913,863 B2 | 7/2005 | Wu et al. |
| 6,916,354 B2 | 7/2005 | Elliott |
| 6,916,863 B2 | 7/2005 | Hemmings et al. |
| 6,960,626 B2 | 11/2005 | Takekoshi et al. |
| 6,962,181 B2 | 11/2005 | Deevers et al. |
| 6,972,144 B2 | 12/2005 | Roth et al. |
| 6,981,996 B2 | 1/2006 | Shaner et al. |
| 6,994,925 B2 | 2/2006 | Masaki |
| 7,007,990 B2 | 3/2006 | Van Damme et al. |
| 7,015,271 B2 | 3/2006 | Bice et al. |
| 7,037,865 B1 | 5/2006 | Kimberly |
| 7,069,990 B1 | 7/2006 | Bilak |
| 7,164,197 B2 | 1/2007 | Mao et al. |
| 7,169,489 B2 | 1/2007 | Redmond |
| 7,176,269 B2 | 2/2007 | Hakuta et al. |
| 7,204,191 B2 | 4/2007 | Wiley et al. |
| 7,216,938 B2 | 5/2007 | Phillips |
| 7,230,044 B2 | 6/2007 | Takekoshi et al. |
| 7,232,473 B2 | 6/2007 | Elliott |
| 7,249,804 B2 | 7/2007 | Zank et al. |
| 7,324,261 B2 | 1/2008 | Tonar et al. |
| 7,370,893 B2 | 5/2008 | Tamada et al. |
| 7,406,990 B2 | 8/2008 | Brown et al. |
| 7,449,224 B2 | 11/2008 | Ensinger |
| 7,478,849 B2 | 1/2009 | Fortin |
| 7,491,356 B2 | 2/2009 | Heikkila |
| 7,507,480 B2 | 3/2009 | Sugama |
| 7,511,102 B2 | 3/2009 | Hasegawa et al. |
| 7,528,189 B2 | 5/2009 | Taylor et al. |
| 7,531,583 B2 | 5/2009 | Desai |
| 7,533,912 B2 | 5/2009 | Frederick et al. |
| 7,552,955 B2 | 6/2009 | Evans |
| 7,559,348 B2 | 7/2009 | Puhala et al. |
| 7,589,284 B2 | 9/2009 | Severance et al. |
| 7,628,971 B2 | 12/2009 | Stenzel et al. |
| 7,649,029 B2 | 1/2010 | Kolb et al. |
| 7,671,227 B2 | 3/2010 | Dawes et al. |
| 7,841,669 B2 | 11/2010 | Zank |
| 7,878,599 B2 | 2/2011 | Astorino et al. |
| 7,883,156 B2 | 2/2011 | Pursley et al. |
| 8,086,611 B2 | 12/2011 | Van Vleck et al. |
| 8,487,034 B2 | 7/2013 | Heikkila et al. |
| 2001/0050020 A1 | 12/2001 | Davis et al. |
| 2002/0000275 A1 | 1/2002 | Fogal, Sr. |
| 2002/0079707 A1 | 6/2002 | Skarie et al. |
| 2002/0114940 A1 | 8/2002 | Clemens et al. |
| 2002/0124759 A1 | 9/2002 | Amick |
| 2002/0153144 A1 | 10/2002 | Weaver |
| 2002/0195257 A1 | 12/2002 | Poynton |
| 2003/0027005 A1 | 2/2003 | Elliott |
| 2003/0045619 A1 | 3/2003 | Scholl et al. |
| 2003/0065070 A1 | 4/2003 | Nishida |
| 2003/0069344 A1 | 4/2003 | Nishikawa et al. |
| 2003/0109614 A1 | 6/2003 | Luginsland et al. |
| 2003/0130418 A1 | 7/2003 | Hamilton et al. |
| 2003/0133193 A1 | 7/2003 | Martinez |
| 2003/0143099 A1 | 7/2003 | Amick |
| 2003/0155055 A1 | 8/2003 | Leblanc |
| 2003/0161751 A1 | 8/2003 | Elliott |
| 2003/0164063 A1 | 9/2003 | Elliott |
| 2004/0023087 A1 | 2/2004 | Redmond |
| 2004/0032638 A1 | 2/2004 | Tonar et al. |
| 2004/0118496 A1 | 6/2004 | Vannan et al. |
| 2004/0127614 A1 | 7/2004 | Jiang et al. |
| 2004/0135384 A1 | 7/2004 | Pritchard et al. |
| 2004/0140042 A1 | 7/2004 | Teratani et al. |
| 2004/0159386 A1 | 8/2004 | Deevers et al. |
| 2004/0174024 A1 | 9/2004 | Murata et al. |
| 2004/0177720 A1 | 9/2004 | Shaner et al. |
| 2004/0220307 A1 | 11/2004 | Wu |
| 2004/0220321 A1 | 11/2004 | Bataille et al. |
| 2005/0005807 A1 | 1/2005 | Wiley et al. |
| 2005/0014499 A1 | 1/2005 | Knoblach et al. |
| 2005/0043112 A1 | 2/2005 | Stevens et al. |
| 2005/0062332 A1 | 3/2005 | Amyot et al. |
| 2005/0153610 A1 | 7/2005 | McCarthy et al. |
| 2005/0167019 A1 | 8/2005 | Puhala et al. |
| 2005/0188879 A1 | 9/2005 | Wiley et al. |
| 2005/0238864 A1 | 10/2005 | D'Souza et al. |
| 2005/0258404 A1 | 11/2005 | McCord |
| 2006/0016535 A1 | 1/2006 | Mauclin et al. |
| 2006/0020086 A1 | 1/2006 | Smith |
| 2006/0029795 A1 | 2/2006 | Sawyer et al. |
| 2006/0043743 A1 | 3/2006 | Shuler et al. |
| 2006/0055077 A1 | 3/2006 | Heikkila |
| 2006/0075919 A1 | 4/2006 | Wiley et al. |
| 2006/0099129 A1 | 5/2006 | Stenzel et al. |
| 2006/0102041 A1 | 5/2006 | Wiley et al. |
| 2006/0105053 A1 | 5/2006 | Marx et al. |
| 2006/0118211 A1 | 6/2006 | Elliott |
| 2006/0118311 A1 | 6/2006 | Serritella et al. |
| 2006/0137575 A1 | 6/2006 | Stenzel et al. |
| 2006/0199906 A1 | 9/2006 | Walton et al. |
| 2007/0005818 A1 | 1/2007 | Tsuruoka et al. |
| 2007/0021566 A1 | 1/2007 | Tse et al. |
| 2007/0034311 A1 | 2/2007 | Brown et al. |
| 2007/0066756 A1 | 3/2007 | Poon et al. |
| 2007/0113759 A1 | 5/2007 | Roth et al. |
| 2007/0161732 A1 | 7/2007 | Hasegawa et al. |
| 2007/0175557 A1 | 8/2007 | Puhala et al. |
| 2007/0207186 A1 | 9/2007 | Scanlon et al. |
| 2007/0236938 A1 | 10/2007 | Ouderkirk et al. |
| 2007/0236939 A1 | 10/2007 | Ouderkirk et al. |
| 2007/0299160 A1 * | 12/2007 | Delanaye .................. C08L 23/10 523/218 |
| 2008/0049295 A1 | 2/2008 | Tonar et al. |
| 2008/0063850 A1 | 3/2008 | Vilchis Ramirez et al. |
| 2008/0069852 A1 | 3/2008 | Shimp et al. |
| 2008/0098935 A1 | 5/2008 | Roth et al. |
| 2008/0139722 A1 | 6/2008 | Shefelbine et al. |
| 2008/0139731 A1 | 6/2008 | Lawson et al. |
| 2008/0160302 A1 | 7/2008 | Asrar et al. |
| 2008/0171828 A1 | 7/2008 | Bening et al. |
| 2008/0207937 A1 | 8/2008 | Dawes et al. |
| 2008/0245460 A1 | 10/2008 | Brown et al. |
| 2008/0275151 A1 | 11/2008 | Strandburg et al. |
| 2008/0293871 A1 | 11/2008 | Stenzel et al. |
| 2008/0299990 A1 | 12/2008 | Knoblach et al. |
| 2008/0315453 A1 | 12/2008 | Molitor et al. |
| 2009/0032088 A1 | 2/2009 | Rabinowitz |
| 2009/0039661 A1 | 2/2009 | Frederick et al. |
| 2009/0068363 A1 | 3/2009 | Smetana |
| 2009/0078353 A1 | 3/2009 | Majumdar et al. |
| 2009/0084042 A1 | 4/2009 | Ramanath et al. |
| 2009/0084482 A1 | 4/2009 | Majumdar et al. |
| 2009/0084483 A1 | 4/2009 | Majumdar et al. |
| 2009/0087661 A1 | 4/2009 | Eder |
| 2009/0101225 A1 | 4/2009 | Buchner |
| 2009/0105417 A1 | 4/2009 | Walton et al. |
| 2009/0127801 A1 | 5/2009 | Heikkila |
| 2009/0127919 A1 | 5/2009 | Burnett |
| 2009/0133793 A1 | 5/2009 | Bergman et al. |
| 2009/0136754 A1 | 5/2009 | Rao et al. |
| 2009/0227792 A1 | 9/2009 | Briehn et al. |
| 2009/0242091 A1 | 10/2009 | Puhala et al. |
| 2009/0254171 A1 | 10/2009 | Heikkila |

(56) References Cited

U.S. PATENT DOCUMENTS

| | | | |
|---|---|---|---|
| 2009/0255613 A1* | 10/2009 | Zhang | B60C 11/00 |
| | | | 152/209.5 |
| 2009/0303593 A1 | 12/2009 | Sagar et al. | |
| 2009/0314482 A1 | 12/2009 | Heikkila | |
| 2009/0315214 A1 | 12/2009 | Heikkila et al. | |
| 2009/0324875 A1 | 12/2009 | Heikkila | |
| 2010/0016459 A1 | 1/2010 | Cernohous | |
| 2010/0048807 A1 | 2/2010 | Masarati et al. | |
| 2010/0279100 A1 | 11/2010 | Heikkila et al. | |
| 2010/0280145 A1 | 11/2010 | Heikkila et al. | |
| 2010/0280164 A1 | 11/2010 | Heikkila et al. | |
| 2010/0291374 A1 | 11/2010 | Akarsu et al. | |
| 2010/0324171 A1 | 12/2010 | Maljkovic et al. | |
| 2010/0331458 A1* | 12/2010 | Cernohous | C08L 23/0815 |
| | | | 264/572 |
| 2013/0130026 A1 | 5/2013 | Heikkila et al. | |
| 2013/0157053 A1 | 6/2013 | Heikkila et al. | |

FOREIGN PATENT DOCUMENTS

| | | |
|---|---|---|
| CN | 1902271 B | 6/2011 |
| CN | 101959946 B | 11/2012 |
| DE | 10254877 A1 | 6/2004 |
| DE | 200612954 | 11/2006 |
| EP | 0287045 A2 | 10/1988 |
| EP | 0376461 A2 | 7/1990 |
| EP | 1150311 A2 | 10/2001 |
| EP | 1762751 A1 | 3/2007 |
| EP | 1752491 B1 | 3/2009 |
| FR | 1248939 | 10/1960 |
| FR | 1308945 | 12/1961 |
| FR | 1530795 | 6/1967 |
| GB | 827308 A | 2/1960 |
| GB | 836316 A | 6/1960 |
| GB | 838857 A | 6/1960 |
| GB | 911275 | 11/1962 |
| GB | 914753 A | 1/1963 |
| GB | 964937 A | 7/1964 |
| GB | 974764 | 11/1964 |
| GB | 1246829 A | 9/1971 |
| GB | 1259481 A | 1/1972 |
| GB | 2179664 A | 3/1987 |
| JP | 63273664 | 11/1988 |
| JP | 2022375 U | 1/1990 |
| JP | 02022375 | 5/1990 |
| JP | 02219872 | 9/1990 |
| JP | 06226771 | 8/1994 |
| JP | 07258475 | 10/1995 |
| JP | 11172162 | 6/1999 |
| JP | 2000256569 | 9/2000 |
| JP | 2001030697 | 2/2001 |
| JP | 2001041290 | 2/2001 |
| JP | 2001123011 | 5/2001 |
| JP | 2001183099 | 7/2001 |
| JP | 201349381 | 12/2001 |
| JP | 2001349381 | 12/2001 |
| JP | 2002013592 | 1/2002 |
| JP | 2002257499 | 9/2002 |
| JP | 2007297432 | 11/2007 |
| WO | WO8505113 | 11/1985 |
| WO | WO9305101 | 3/1993 |
| WO | WO9800462 | 1/1998 |
| WO | WO02086347 | 10/2002 |
| WO | WO03029343 | 4/2003 |
| WO | WO2005012408 | 2/2005 |
| WO | WO2005049714 | 6/2005 |
| WO | WO2005049764 | 6/2005 |
| WO | WO2007094764 | 8/2007 |
| WO | WO2007134788 | 11/2007 |
| WO | WO2008022781 | 2/2008 |
| WO | WO2009091987 | 7/2009 |
| WO | 2010127117 A1 | 11/2010 |
| WO | WO2010127101 | 11/2010 |
| WO | WO2010127106 | 11/2010 |
| WO | WO2010127117 | 11/2010 |

OTHER PUBLICATIONS

Bose et al., "Effect of Particle Size of Filler on Properties of Nylon-6," Journal of Minerals & Materials Characterization & Engineering, vol. 3, No. 1, pp. 23-31 (2004).

Chemical Book perfluoroalkylvinyl ether Product Information Obtained May 20, 2014 at http://www.chemicalbook.com/ChemicalProductProperty.sub.--EN.sub.--CB4319- 708 htm.

Cheney, "Production of Tungsten, Molybdenum, and Carbide Powders," GTE Products Corp., pp. 152-159 (Date Unknown).

Cho et al., "Some observations on the tribological performance of polymer composites filled with minerals from Armenia," Wear and Tribology, http://ses.confex.com/ses/2004tm/techprogram/P1371. HTM, 1 page (Oct. 12, 2004).

Coleman, M M. et al., "Infrared Spectroscopy: Applicatoins to Chemical Systems," vol. 4, Academic Press, Inc., New York, (pp. 469-472), (1978).

Coleman, M. M. et al., "Infrared Spectroscopy: Applications to Chemical Systems," vol. 4, Academic Press, Inc., New York, (pp. 469-472), (1978).

Communication Pursuant to Article 94(3) EPC, for European Patent Application No. 10717959.0, dated Nov. 19, 2014 (4 pages).

Co-owned U.S. Appl. No. 12/278,633, filed Jan. 21, 2009, entitled "Metal Polymer Composite with Enhanced Viscoelastic and Thermal Properties", which published as U.S. Pat. Publ. No. 2009/0314482 on Dec. 24, 2009 (102 pages).

Co-owned U.S. Appl. No. 12/278,638, filed Nov. 7, 2008, entitled "Enhanced Property Metal Polymer. Composite", which published as U.S. Pat. Publ. No. 2009/0127801 on Oct. 8, 2009 (73 pages).

Co-owned U.S. Appl. No. 12/355,203, filed Jan. 16, 2009, entitled "Melt Molding Polymer Composite and Method of Making and Using the Same", which published as U.S. Pat. Publ. No. 2009/0315214 on Dec. 24, 2009 (46 pages).

Co-owned U.S. Appl. No. 12/769,500, filed Apr. 28, 2010, entitled "Ceramic Composite", which published as U.S. Pat. Publ. No. 2010/0280145 on Nov. 4, 2010 (47 pages).

Co-owned U.S. Appl. No. 12/769,509, filed Apr. 28, 2010, entitled "Inorganic Composite", which published as U.S. Pat. Publ. No. 2010/0280164 on Nov. 4, 2010 (71 pages).

Co-owned U.S. Appl. No. 12/769,553, filed Apr. 28, 2010, entitled "Reduced Density Glass Bubble Polymer Composite", which published as U.S. Pat. Publ. No. 2010/0279100 on Nov. 4, 2010 (68 pages).

DePass, "Getting the lead out: Alliant's 'green' bullet," Star Tribune, http://www.startribune.com/viewers/story.php?template=print. sub.--a&story- =4075320, 3 pages (Published Sep. 3, 2003).

DuPont(TM) Teflon PTFE 6C, fluoropolymer resin. (Apr. 2005) DuPont.

European Search Report for European Patent Application No. 10 18 2628, dated Nov. 3, 2010, entitled "Metal Polymer Composite, a Method for its Extrusion and Shaped Articles Therefrom" (9 pages).

European Search Report for European Patent Application No. 10 18 2673, dated Nov. 3, 2010, entitled "Metal Polymer Composite, a Method for its Extrusion and Shaped Articles Made Therefrom" (10 pages).

File History for co-pending U.S. Appl. No. 10/988,214, filed Nov. 12, 2004, entitled "Enhanced Property Metal Polymer Composite", which published as U.S. Pat. Publ. No. 2009/0324875 on Dec. 31, 2009 (473 pages).

File History for co-pending U.S. Appl. No. 12/276,947, filed Nov. 24, 2008, entitled "Enhanced Property Metal Polymer Composite", which published as U.S. Pat. Publ. No. 2009/0254171 on Oct. 8, 2009 (156 pages).

Graham, J F. et al., "Surface Derivatization of Nanoscale Tungsten Probes for Interfacial Force Microscopy," Interface Science Western, Department of Chemistry, University of Western Ontario, London, Ontario Canada. Mar. 23, 1999, 6 pgs.

(56) References Cited

OTHER PUBLICATIONS

Hague et al., "S2-Glass/Epoxy Polymer Nanocomposites: Manufacturing, Structures, Thermal and Mechanical Properties," Jounal of Composite Materials, vol. 37, No. 20, pp. 1821-1837 (2003) (2 page abstract).
Hague, A. et al., "S2-Glass/Vinyl ester Polymer Nanocomposites: Manufacturing, Structures, Thermal and Mechanical Properties," 9 pages (Publicly known at least as early as Nov. 24, 2008).
International Search Report and Written Opinion for PCT/US06/04817 dated Jul. 3, 2008 (29 pages).
International Search Report and Written Opinion for PCT/US2004/037931 dated May 25, 2005 (28 pages).
International Search Report and Written Opinion for PCT/US2010/032969 dated Sep. 15, 2010 (14 pages).
International Search Report and Written Opinion, for PCT/US06/04725 dated Nov. 9, 2006 (14 pages).
International Search Report and Written Opinion, for PCT/US2010/032950, dated Sep. 15, 2010 (13 pages).
International Search Report and Written Opinion, for PCT/US2010/032956, dated Sep. 15, 2010 (13 pages).
Kroschwitz, "Plastics", Concise Encyclopedia of Polymer Science and Engineering. (pp. 186-189), John Wiley & Sons (1990). John Wiley & Sons 1990.
Kroschwitz, "Plastics," Concise Encyclopedia of Polymer Science and Engineering. (pp. 186-189), John Wiley & Sons (1990).
Lai et al., "A Study on the Friction and Wear Behavior of PTFE Filled with Acid Treated Nano-Attapulgite," Macromolecular Materials and Engineering, vol. 289, pp. 916-922 (2004).
Lassner, Erik et al., "Tungsten: Properties, chemistry, Technology of the Element, Alloys, and Chemical Compounds," Vienna University of Technology Vienna, Austria. Kluwer Academic/ Plenum Publishers New York, Boston,Dordrecht, London, Moscow. Springer (1999), 4 pgs.
Manoudis et al., "Polymer-Silica nanoparticles composite films as protective coatings for stone-based monuments," Journal of Physics: Conference Series, vol. 61, pp. 1361-1365 (2007).
Meyers, M. et al., "Biological materials: Structure and mechanical properties," Progress in Materials Science, vol. 53, No. 1, pp. 1-206, http://www.sciencedirect.com/science?.sub.-ob=ArticleURL&.sub.-udi=B6TX- 1-4NS0KM2-1&.sub.-u . . . , (Jan. 2008) (3 page abstract).
Nickel, Ernest H. "The Definition of a Mineral", The Canadian Mineralogist, vol. 33, 1 page (1995).
Nickel, Ernest H. , "The Definition of a Mineral", The Canadian Mineralogist, vol. 33, (1995). 1 pg.
Non-Final Office Action, for U.S. Appl. No. 12/276,94, dated Aug. 20, 2014 (15 pages).
Plueddemann, Edwin P. "Silane Coupling Agents," Second Edition. Scientist Emeritus Dow Corning Corporation Midland, Michigan. Plenum Press, new York and London. Springer-Verlag New York, LLC, Apr. 1991, 12 pgs.
Rothon, "Particulate-Filled Polymer Composites, Second Edition," http://www.rapra.net/default.asp?Page=139&Lang=1&ChangeCurrency=$&ItemID=- 159 . . . , pp. 1-6 (2003).
Sawyer et al., "Low Friction and Low Wear Polymer/Polymer Composites," Abstract No. 20070005854, 2 pages abstract (Sep. 9, 2004).
Sawyer et al., "Multi-Layer Low Friction and Low Wear Polymer/ Polymer Composites Having Compositionally Graded Interfaces," Abstract No. 20070005818, 1 page abstract (May 31, 2005).
Sawyer, et al., "Low Friction and Low Wear Polymer/ Polymer Composites," Abstract No. 20070005854, 2 page abstract (Sep. 9, 2004).
Scheirs, John, "Modern Fluoropolymers", 1 page (1997).
Scheirs, John, "Modern Fluoropolymers", 1 pg., (1997).
Shedd, "Tungsten," U.S. Geological Survey Minerals Yearbook, 16 pages (1999).
Summerscales, "Composites Design and Manufacture (BEng)-MATS 324 Composites publications," http://www.tech.plym.ac.uk/sme/MATS324/Publications.htm, pp. 1-7 (Feb. 17, 2005).
Wadud, "Time-Temperature Superposition Using DMA Creep Data," TA Instruments, Inc., pp. 1-4 (Date Unknown).
Wypych, "The Effect of fillers on the mechanical properties of filled materials" Handbook of Fillers 2.sup.nd Edition, Chem. Tec. Publishing, Toronto (1999) (3 pages).
"Non Final Office Action", dated Jul. 6, 2011 in co-pending U.S. Appl. No. 10/988,214, "Enhanced Property Metal Polymer Composite," (11 pages). , 11 pgs.
"Non Final Office Action", dated Mar. 17, 2011 in co-pending U.S. Appl. No. 12/276,947, "Enhanced Property Metal Polymer Composite," (10 pages) , 10 Pgs.
"Non Final Office Action", dated Mar. 25, 2011 in copending U.S. Appl. No. 12/278,638, "Enhanced Property Metal Polymer Composite," (27 pages). , 27 Pgs.
"Non Final Office Action", dated Nov. 25, 2011 in copending U.S. Appl. No. 12/278,633, "Metal Polymer Composite with Enhanced Viscoeleastic and Thermal Properties," (31 Pages). , 31.
"Non Final Office Action," for U.S. Appl. No. 13/762,714, dated Feb. 4, 2015 (56 pages).
"Non-Final Office Action dated Nov. 25, 2011 in co-pending U.S. Appl. No. 12/278,633, "Metal Polymer Composite with Enhanced Viscoelastic and Thermal Properties," (31 Pages).", , 31.
"Non-Final Office Action", for U.S. Appl. No. 12/769,500, dated Sep. 12, 2013 (9 pages).
"Non-Final Office Action", for U.S. Appl. No. 12/769,509, dated Nov. 13, 2013 (17 pages).
"Non-Final Office Action", for U.S. Appl. No. 12/769,553 dated Feb. 14, 2013, 36 pages.
"Non-Final Office Action", from U.S. Appl. No. 12/276,947, dated May 7, 2013, 30 pages.
"Non-Final Office Action", dated Apr. 20, 2012 co-pending U.S. Appl. No. 12/355,203 Melt Molding Polymer Composite and Method of Making and Using the Same (33 pgs).
"Non-Final Office Action", dated Apr. 20, 2012 Melt Molding Polymer Composite and Method of Making and Using the Same (33 pgs).
"Non-Final Office Action", dated Aug. 27, 2012 in U.S. Appl. No. 12/769,509, "Inorganic Composite," (35 pages).
"Non-Final Office Action", dated Jan. 3, 2013 in co-pending U.S. Appl. No. 12/769,500, "Ceramic Composite," (10 pages).
"Nontoxic High Density Compounds," PolyOne. Sep. 12, 2003. 2 pgs.
"Notice of Allowance," for U.S. Appl. No. 12/355,203, dated Mar. 28, 2013 (33 pages).
"Notice of Allowance," for U.S. Appl. No. 13/762,714, dated Jun. 10, 2015 (17 pages).
"Notice of Non-Compliant Amendment," dated Nov. 30, 2012 in co-pending U.S. Appl. No. 12/769,509, "Inorganic Composite," (2 pages).
"Notice on the Second Office Action", for Chinese Application No. 201080018729.1 dated May 15, 2013 (18 pages).
"Office Action", dated Jul. 27, 2011, in EP Applic. No. 10182673.3-2102, filed Sep. 29, 2010, 39 pages.
"Office Action", dated Jun. 4, 2012, in Korea, Patent Applic. 2008-7022046, filed Feb. 10, 2006 English translation included, 16 pages.
"PCT Notification Concerning Transmittal of International Preliminary Report on Patentability", from International Application No. PCT/US10/32950, corresponding to U.S. Appl. No. 12/769,500, dated Nov. 10, 2011, pp. 1-7, 7.
"PCT Notification Concerning Transmittal of International Preliminary Report on Patentability", from International Application No. PCT/US10/32956, corresponding to U.S. Appl. No. 12/769,509, dated Nov. 10, 2011, pp. 1-7, 7.
"PCT Notification Concerning Transmittal of International Preliminary Report on Patentability", from International Application No. PCT/US10/32969, corresponding to U.S. Appl. No. 12/769,553, dated Nov. 10, 2011, pp. 1-7, 7.
"Photomicrograph of Dispersed Regular Particles in Fractured Composite." Aug. 2008 p. 1.
"Photomicrograph of Dispersed Regular Particles in Fractured Composite," 1 page; Aug. 2008.

(56) References Cited

OTHER PUBLICATIONS

"Photomicrograph of Dispersed Regular Particles in Fractured Composite." Aug. 2008 p. 1.
"Putting it Together—The Science and Technology of Composite Materials," Nova Science in the News, http://www.science.org.au/nova/059/059key.htm, 4 pages (Date Printed Aug. 11, 2008).
"Random House Unabridged Dictionary," Second Edition. Random House, Inc. (1993), (pp. 394; 993) 4 pgs.
"Renewable Feedstock for Sustainable Matetrials—Bioproducts— Their Importance to Wales: A Scoping Study," The Centre for Advanced & Renewable Materials, pp. 1-58 (Nov. 2002).
"Response to Article 94(3) EPC Action", from EP Application No. 10182673.3, filed Jan. 24, 2012, 13 pages.
"Response to Final Office Action," for U.S. Appl. No. 12/276,947, filed May 11, 2015 (22 pages).
"Response to Final Office Action," dated Oct. 17, 2012 in co-pending U.S. Appl. No. 12/769,500, Ceramic Composite, filed with USPTO Dec. 14, 2012. (11 pages).
"Response to Non-Final Office Action", from U.S. Appl. No. 12/769,553, filed Jun. 14, 2013, 67 pages.
"Response to Non-Final Office Action," for U.S. Appl. No. 13/762,714, filed May 4, 2015 (9 pages).
"Response to Non-Final Office Action," dated Aug. 27, 2012 in co-pending U.S. Appl. No. 12/769,509, Inorganic Composite, filed with USPTO Nov. 27, 2012. (21 pages).
"Response to Notice of Non-Compliant Amendment," dated Nov. 30, 2012, in co-pending U.S. Appl. No. 12/769,509, filed with USPTO Dec. 10, 2012. (10 pages).
"Restriction Requirement", dated May 24, 2012 in U.S. Appl. No. 12/769,509, "Inorganic Composite ," (8 pages).
"Rheology Glossary," Rheology and viscosity testing, training and consultancy. www.rheologyschool.com/rheology.sub.-glossary.html. Feb. 13, 2012, 4 pgs.
"Specifications," PolyOne. (Date Unknown). 2 pgs.
"Standard Specification for Biaxially Oriented Polymeric Resin Film for Capacitors in Electrical Equipment," ASTM International (2009), 7 pgs.
"Steel Wheel Weights," Materials from web sites of suppliers of auto wheel weights, 1 page (Date Printed Jan. 20, 2006).
"The Nontoxic Alternative to Lead—Nontoxic High Density Compounds," MASS.RTM., 2 pages (Sep. 12, 2003).
"The Nontoxic Alternative to Lead—Specifications," MASS.RTM., 2 pages (Date Unknown).
"Third Office Action", for Chinese Patent Application No. 201080018728.7, dated Oct. 15, 2014 (7 pages) including English translation.
"Tundra and 3M Silanes," http://www.gelest.com/gelestsearch/gelest/gelest.sub.-form.asp?formgroup-=basenp.sub.--form.sub.--group and http://www.alfa.com/en/GP100W.pgm?DSSTK=L14043&md=573686392, Apr. 14, 2011, 3 pgs.
"Zinc Wheel Weights," Materials from web sites of suppliers of auto wheel weights, 1 page (Date Printed Jan. 20, 2006).
A Guide to Silane Solutions from Dow Corning, 30 pages (Copyright 2005).
Arkles, "Gelest Silane Coupling Agents: Connecting Across Boundaries," Gelest, Inc., Cover Page, pp. 1-20 (.COPYRGT. 2003).
Bhowmik et al., "Influence of Mineral--Polymer Interactions on Molecular Mechanics of Polymer in Composite Bone Biomaterials," Materials Research Society, http://www.mrs.org/s.sub.--mrs/sec.sub.--subscribe.asp?CID=7637&-DID=194200&action=detail, 2 pages (Date Printed Aug. 11, 2008).
"3M Flexible Magnet Tape Bendable. Bondable. Adaptable. Dependable," 3M Flexible Magnet Tape for versatile attachment solutions., http://solutions.3m.com/wps/portal/3M/en.sub.--US/3M-Industrial/Adhesives- /Product/Fasteners/?WT.mc.sub.-id=www.3m.com/fasteners, 2 pages. (Copyright 2012).
"ASTM D3664, "Standard Specification", for Biaxially Oriented Polymeric Resin Film for Capacitors in Electrical Equipment", 7 pages, 2009.

"Bridging the gap with coupling agents," Article of the Week by SpecialChem, http://www.specialchem4polymers.com/2456/eng/article.aspx?id=1355, pp. 1-7 (Aug. 25, 2003).
"Characterization and Failure Analysis of Plastics," ASM International, (2003) 5 pgs.
"Composite Material," Wikipedia, the free encyclopedia, http://en.wikipedia.org/wiki/Composite.sub.-material, pp. 1-5 (Aug. 11, 2008).
"Decision on Rejection," from CN Application No. 201080018729.1, dated Sep. 26, 2013 (17 pages).
"Declaration of Rodney Williams", dated Jun. 13, 2013, 7 pages.
"DuPont(TM) Teflon PTFE 6C, fluoropoiymer resin", DuPont (May 2005), 2 pgs.
"Dyneon Flouroplastics Product Comparison Guide," Dyneon LLC (A 3M Company), Jun. 2003, 10 pages.
"Dyneon THV 221 AZ Ultra Flexible THV in Aggolomerate Form," Dyneon a 3M Company. Mar. 2009, 2 pgs.
"Dyneon.TM. Fluoroelastomers Processing Fluoroelastomers," Dyneon LLC ( A 3M Company), pp. 1-8 (Jan. 2001).
"Dyneon.TM. Fluoroplastics Product Comparison Guide," Dyneon LLC ( A 3M Company), 7 pages (Jun. 2003).
"Dyneon.TM. Fluorothermoplastics FEP X 6301, FEP X 6303 and FEP X 6307," Dyneon LLC ( A 3M Company), 2 pages (Aug. 2001).
"Dyneon.TM. Fluorothermoplastics Product Information," Dyneon LLC ( A 3M Company), 2 pages (Dec. 2000).
"Dyneon.TM. Fluorothermoplastics THV220A," Dyneon LLC ( A 3M Company), 2 pages (Aug. 2001).
"Dyneon.TM. THV Fluorothermoplastics Injection Molding Guidelines," Dyneon LLC ( A 3M Company), 2 pages (Apr. 2001).
"Ebnesajjad, Sina and Khaladkar, Pradip, "Fluoropolymers," Applications in Chemical Processing Industries," 16 pages, 2004.
"Ecomass.RTM. Compounds Product Data Sheet PEM-01-01-110-LTS," PolyOne Corporation, 1 page (Apr. 26, 2002).
"Ecomass.RTM. Compounds Product Data Sheet PEM-07-01-090-LTS," PolyOne Corporation, 1 page (Apr. 26, 2002).
"Ellis, Bryan and Smith Ray (edited by), Polymers, a Property Database, Second Edition", CRC Press, 2009, 4 pages.
"Features Specifications: Non-Metallic Polymer Composite,," http://www.alibaba.com/product-gs/207051916/non.sub.--metallic.sub.-poly- mer.sub.-composite.html, 2 pages (date Printed Aug. 11, 2008).
"Final Office Action Received", dated Dec. 13, 2011 in co-pending U.S. Appl. No. 12/278,638, "Enhanced Property Metal Polymer Composite," (12 Pages). , 12.
"Final Office Action", for Japanese Patent Application No. 2012-508730, dated Nov. 25, 2014 (9 pages) with English translation.
"Final Office Action", for U.S. Appl. No. 12/769,500, dated Jul. 17, 2013 (20 pages).
"Final Office Action", for U.S. Appl. No. 12/769,509, dated Mar. 12, 2013 (27 pages).
"Final Office Action", dated Jul. 25, 2012 in U.S. Appl. No. 10/988,214, "Enhanced Property Metal Polymer Composite", pp. 1-18.
"Final Office Action", dated Jul. 25, 2012 in U.S. Appl. No. 10/988,214, "Enhanced Property Metal Polymer Composite," (18 pages).
"Final Office Action", dated Jun. 6, 2012 in U.S. Appl. No. 12/278,633, "Metal Polymer Composite with Enhanced Viscoelastic and Thermal Properties," (18 pages).
"Final Office Action", dated Jun. 6, 2012 in U.S. Appl. No. 12/278,633, "Metal Polymer Composite with Enhanced Viscoelastic and Thermal Properties", pp. 1-18.
"Final Office Action", dated Mar. 3, 2011 in co-pending U.S. Appl. No. 10/988,214, "Enhanced Property Metal Polymer Composite" (14 pages). , 14 Pgs.
"Final Office Action", dated Nov. 2, 2011 in co-pending U.S. Appl. No. 12/276,947, "Enhanced Property Metal Polymer Composite," (12 pages). , 12.
"Final Office Action", dated Oct. 17, 2012 in U.S. Appl. No. 12/769,500, "Ceramic Composite," (11 pages).
"Final Office Action," for U.S. Appl. No. 12/276,947, dated Mar. 10, 2015 (22 pages).

(56) References Cited

OTHER PUBLICATIONS

"Final Office Action," for U.S. Appl. No. 12/276,947, dated Nov. 7, 2013 (14 pages).

"First Office Action", for China Application No. 201080018728.7, dated Mar. 21, 2013 (5 pages).

"First Office Action", from JP Application No. 2012-508730, dated Aug. 16, 2013, 5 pages.

"First Office Action," from CN Application No. 2010800187291, dated Dec. 6, 2012, (pp. 1-8) Including English translation.

"Formula for Shear," Mar. 5, 2012. 1 pg.

"Gelest-Silane Coupling Agents: Connectiong Across Boundaries," Gelest Inc. (2006). 60 pgs.

"High Performance Innovations: Case Studies," 20 pages. (Publicly known at least as early as Nov. 24, 2008).

"JP Office Action Received," First Office Action from JP Application No. 2010-543277, dated Nov. 6, 2012, 9 pages, Including English translation.

"Ken-React.RTM. Reference Manual Titanate, Zirconate and Aluminate Coupling Agents," Kenrich Petrochemicals, Inc., 8 pages (Date Unknown).

"Lead Free Weight Suppliers," Materials from web sites of suppliers of auto wheel weights, 2 pages. (Jul. 2005).

"M. Gill Corporation—Glossary," Accessed Nov. 22, 2011, 15 pgs.

"M.C. Gill Corporation—Glossary," Accessed Nov. 22, 2011. 15 pgs.

"Moldman 8000: Presentation," Moldman Machines Low Pressure Injection Molding Technology. moldmanmachines.com/moldman.sub.--8000.sub.-presentation.php. Jun. 8, 2012. 1 pg.

"Non Final Office Action", Citation dated Mar. 29, 2012 co-pending U.S. Appl. No. 12/769,500, "Ceramic Composite," (17 pages).

"Non Final Office Action", from U.S. Appl. No. 12/769,553, dated Jan. 27, 2012 (7 pages).

"Non Final Office Action", dated Jan. 27, 2012 in copending U.S. Appl. No. 12/769,553, "Reduced Density Glass Bubble Polymer Composite," (7 pages). , 7.

\* cited by examiner

REDUCED DENSITY HOLLOW GLASS MICROSPHERE POLYMER COMPOSITE

CROSS-REFERENCE TO OTHER APPLICATIONS

This application claims the benefit and is a continuation of application Ser. No. 16/546,831, filed Aug. 20, 2019 and is a continuation of application Ser. No. 15/680,835, filed Aug. 17, 2017, which is a continuation of application Ser. No. 14/965,997, filed Dec. 11, 2015 now U.S. Pat. No. 9,771,463, which is a continuation of application Ser. No. 12/769,553, filed Apr. 27, 2010 now U.S. Pat. No. 9,249,283, and Provisional Application No. 61/173,791, filed Apr. 28, 2009. All of these applications and patents are hereby incorporated by reference in their entirety.

FIELD OF THE INVENTION

The invention relates to a composite of a hollow glass microsphere and a polymer with modifiable properties to produce enhanced products. The novel properties are produced in the composite by novel interactions of the components. The hollow glass microsphere and polymer composite materials are a unique combination of a hollow glass microsphere typically particulate components and a polymer material that optimizes the composite structure and characteristics through blending the combined polymer and hollow glass micros to 90% of the base polymer materials to achieve true composite properties.

BACKGROUND OF THE INVENTION

Substantial attention has been paid to the creation of composite materials with unique properties. Included in this class of materials are materials with improved viscoelastic character, varying densities, varying surface characteristics and other properties which may be used to construct a material with improved properties.

Composite materials have been made for many years by combining generally two dissimilar materials to obtain beneficial properties from both. A true composite is unique because the interaction of the materials provides the best properties and characteristics of both components. Many types of composite materials are known. Generally, the art recognizes that combining metals of certain types and at proportions that form an alloy provides unique properties in metal/metal alloy materials. Metal/ceramic composites have been made typically involving combining metal powder or fiber with clay materials that can be sintered into a metal/ceramic composite.

Combining typically a thermoplastic or thermosetting polymer phase with a reinforcing powder or fiber produces a range of filled materials and, under the correct conditions, can form a true polymer composite. A filled polymer, with the additive as filler, cannot display composite properties. A filler material typically is comprised of inorganic materials that act as either pigments or extenders for the polymer systems. Fillers are often replacements for a more expensive component in the composition. A vast variety of fiber-reinforced composites have been made typically to obtain fiber reinforcement properties to improve the mechanical properties of the polymer in a specific composite.

Many of these materials containing polymer and particulate are admixtures and are not true composites. Admixtures are relatively easily separable into the constituent parts and, once separated, display the individual properties of the components. A true composite resists separation and displays enhanced properties of the input materials whereas the individual input materials often do not display the enhanced properties. A true composite does not display the properties of the individual components but display the unique character of the composite.

While a substantial amount of work has been done regarding composite materials generally, the use of inorganic, non metallic or mineral particles in a polymer composite has not been obtained. Tuning the density the formation of these materials into a composite of a polymer and an inorganic mineral or non-metal provides novel mechanical and physical properties into the composite and, when used, obtains properties that are not present in other materials. A need exists for material that has tunable density, low toxicity, and improved properties in terms of increased conformance, elasticity, and pliability.

BRIEF DESCRIPTION OF THE INVENTION

The invention relates to a composite of a hollow glass microsphere and a polymer having improved and novel properties methods of making and applications of the materials. The material of the invention is provided through a selection of non metallic, hollow glass microsphere particle specie, particle size ($P_s$) distribution, molecular weight, and viscoelastic character and processing conditions. The particles have a specific and novel particle morphology that cooperates with the components of the invention to provide the needed properties to the composite. The material attains adjustable chemical/physical properties through hollow glass microsphere selection and polymer selection. The resulting composite materials exceed the contemporary composites in terms of density, surface character, reduced toxicity, improved malleability, improved ductility, improved viscoelastic properties (such as tensile modulus, storage modulus, elastic-plastic deformation and others) electrical/magnetic properties, resistance to condition of electricity, vibration or sound, and machine molding properties. We have found that density and polymer viscoelasticity measured as elongation are useful properties and useful predictive parameters of a composite in this technology. In the production of useful enhanced properties, the packing of the selected particle sizes ($P_s$, $P_s^1$, etc.), distribution population particles and the selection of the particulate or mixed non-metal, inorganic, ceramic or mineral particulate, will obtain the enhanced properties.

BRIEF DISCUSSION OF THE DRAWINGS

FIGS. 1 to 5 shows enhanced rheological properties in a sealant.

DETAILED DISCUSSION OF THE INVENTION

The invention relates to novel composites made by combining a hollow glass microsphere particulate with a polymer to achieve novel physical electrical surface and viscoelastic properties. A hollow glass microsphere particulate having a particle size ranging from about 10 microns to about 1,500 microns can be used in the invention. The maximum size is such that the particle size ($P_s$) of the particle is less than 20% of either the least dimension or the thinnest part under stress in an end use article. Such particles can be substantially hollow and spherical.

Both thermoplastic and thermosetting resins can be used in the invention. Such resins are discussed in more detail below. In the case of thermoplastic resins, the composites are specifically formed by blending the particulate and interfacial modifier with thermoplastic and then forming the material into a finished composite. Thermosetting composites are made by combining the particulate and interfacial modifier with an uncured material and then curing the material into a finished composite.

In both cases, the particulate material is typically coated with an interfacial surface chemical treatment that supports or enhancing the final properties of the composite.

A composite is more than a simple admixture. A composite is defined as a combination of two or more substances intermingled with various percentages of composition, in which each component results in a combination of separate materials, resulting in properties that are in addition to or superior to those of its constituents. In a simple admixture the mixed material have little interaction and little property enhancement. One of the materials is chosen to increase stiffness, strength or density. Atoms and molecules can form bonds with other atoms or molecules using a number of mechanisms. Such bonding can occur between the electron cloud of an atom or molecular surfaces including molecular-molecular interactions, atom-molecular interactions and atom-atom interactions. Each bonding mechanism involves characteristic forces and dimensions between the atomic centers even in molecular interactions. The important aspect of such bonding force is strength, the variation of bonding strength over distance and directionality. The major forces in such bonding include ionic bonding, covalent bonding and the van der Waals' (VDW) types of bonding. Ionic radii and bonding occur in ionic species such as $Na^+Cl^-Li^+F^-$. Such ionic species form ionic bonds between the atomic centers. Such bonding is substantial, often substantially greater than 100 kJ-mol$^{-1}$ often greater than 250 kJ-mol$^{-1}$. Further, the interatomic distance for ionic radii tend to be small and on the order of 1-3 Å. Covalent bonding results from the overlap of electron clouds surrounding atoms forming a direct covalent bond between atomic centers. The covalent bond strengths are substantial, are roughly equivalent to ionic bonding and tend to have somewhat smaller interatomic distances.

The varied types of van der Waals' forces are different than covalent and ionic bonding. These van der Waals' forces tend to be forces between molecules, not between atomic centers. The van der Waals' forces are typically divided into three types of forces including dipole-dipole forces, dispersion forces and hydrogen bonding. Dipole-dipole forces are a van der Waals' force arising from temporary or permanent variations in the amount or distribution of charge on a molecule.

TABLE 1

Summary of Chemical Forces and Interactions

| Type of Interaction | Strength | Bond Nature | Strength Proportional to: |
|---|---|---|---|
| Covalent bond | Very strong | Comparatively long range | $r^{-1}$ |
| Ionic bond | Very strong | Comparatively long range | $r^{-1}$ |
| Ion-dipole | Strong | Short range | $r^{-2}$ |
| VDW Dipole-dipole | Moderately strong | Short range | $r^{-3}$ |
| VDW Ion-induced dipole | Weak | Very short range | $r^{-4}$ |

TABLE 1-continued

Summary of Chemical Forces and Interactions

| Type of Interaction | Strength | Bond Nature | Strength Proportional to: |
|---|---|---|---|
| VDW Dipole-induced dipole | Very weak | Extremely short range | $r^{-6}$ |
| VDW London dispersion forces | Very weak$^a$ | Extremely short range | $r^{-6}$ |

$^a$Since VDW London forces increase with increasing size and there is no limit to the size of molecules, these forces can become rather large. In general, however, they are very weak.

Dipole structures arise by the separation of charges on a molecule creating a generally or partially positive and a generally or partially negative opposite end. The forces arise from electrostatic interaction between the molecule negative and positive regions. Hydrogen bonding is a dipole-dipole interaction between a hydrogen atom and an electronegative region in a molecule, typically comprising an oxygen, fluorine, nitrogen or other relatively electronegative (compared to H) site. These atoms attain a dipole negative charge attracting a dipole-dipole interaction with a hydrogen atom having a positive charge. Dispersion force is the van der Waals' force existing between substantially non-polar uncharged molecules. While this force occurs in non-polar molecules, the force arises from the movement of electrons within the molecule. Because of the rapidity of motion within the electron cloud, the non-polar molecule attains a small but meaningful instantaneous charge as electron movement causes a temporary change in the polarization of the molecule. These minor fluctuations in charge result in the dispersion portion of the van der Waals' force.

Such VDW forces, because of the nature of the dipole or the fluctuating polarization of the molecule, tend to be low in bond strength, typically 50 kJ mol$^{-1}$ or less. Further, the range at which the force becomes attractive is also substantially greater than ionic or covalent bonding and tends to be about 3-10 Å.

In the van der Waals composite materials of this invention, we have found that the unique combination of particulate, the varying but controlled particle size of the particle component, the modification of the interaction between the particulate and the polymer, result in the creation of a unique van der Waals' bonding. The van der Waals' forces arise between particulate atoms/crystals in the particulate and are created by the combination of particle size, polymer and interfacial modifiers in the composite.

In the past, materials that are characterized as "composite" have merely comprised a polymer filled with particulate with little or no van der Waals' interaction between the particulate filler material. In the invention, the interaction between the selection of particle size distribution and interfacially modified particle enables the particulate to achieve an intermolecular distance that creates a substantial van der Waals' bond strength. The prior art materials having little viscoelastic properties, do not achieve a true composite structure. This leads us to conclude that this intermolecular distance is not attained in the prior art. In the discussion above, the term "molecule" can be used to relate to a particle, a particle comprising non-metal crystal or an amorphous aggregate, other molecular or atomic units or sub-units of non metal or inorganic mixtures. In the composites of the invention, the van der Waals' forces occur between collections of metal atoms that act as "molecules" in the form of mineral, inorganic, or non-metal atom aggregates.

The composite of the invention is characterized by a composite having intermolecular forces between particles about 30 kJ-mol$^{-1}$ and a bond dimension of 3-10 Å. The particulate in the composite of the invention has a range of particle sizes such that about at least 5 wt.-% of particulate in the range of about 10 to 500 microns and about at least 5 wt.-% of particulate in the range of about 10 to 250 microns, and a polymer, the composite having a van der Waals' dispersion bond strength between molecules in adjacent particles of less than about 4 kJ-mol$^{-1}$ and a bond dimension of 1.4 to 1.9 Å or less than about 2 kJ-mol$^{-1}$ and the van der Waals' bond dimension is about 1.5 to 1.8 Å.

In a composite, the reinforcement is usually much stronger and stiffer than the matrix, and gives the composite its good properties. The matrix holds the reinforcements in an orderly high-density pattern. Because the reinforcements are usually discontinuous, the matrix also helps to transfer load among the reinforcements. Processing can aid in the mixing and filling of the reinforcement or particulate. To aid in the mixture, an interfacial modifier can help to overcome the forces that prevent the matrix from forming a substantially continuous phase of the composite. The composite properties arise from the intimate association obtained by use of careful processing and manufacture. We believe an interfacial modifier is an organic material that provides an exterior coating on the particulate promoting the close association but no reactive bonding of polymer and particulate. Minimal amounts of the modifier can be used including about 0.005 to 8 wt.-%, or about 0.02 to 3 wt. %. For the purpose of this disclosure, the term "particulate" typically refers to a material made into a product having a distribution or range of particle size. The size can be greater than 10 microns and having a particle size distribution containing at least some particulate in the size range of 10 to 4000 microns. The particles have a range of sizes and circularity parameters. In a packed state, this particulate has an excluded volume of about 13 to 61 vol.-% or about 30 to 75 vol.-%. Alternatively, the particulate can have greater than about 30 vol. %, greater than about 40 vol. % or about 40 to 70 vol.-% particle loading. In this invention, the particulate can comprise two, three or more particulates sources, in a blend of materials of differing chemical and physical nature. Regarding the particulate material, the term a "majority of the particulate" indicates that while the particulate can contain some small amount of small fines and some particles that are large with respect to the recited range, the majority (greater than 95%, 90%, 85%, etc.) fall within the recited range and contribute to the physical properties of the composite. The glass can be combined with a second particulate such that the second particle differs from the glass by at least ±5 microns, or has a particle size such that according to the formula $P_S \geq 2\, P_S^1$ or $P_S \leq 0.5\, P_S^1$ wherein $P_S$ is the particle size of the hollow glass microsphere and $P_S^1$ is the particle size of the particulate.

For the purpose of this disclosure, the term "non-metallic" relates to a material substantially free of a metal in an oxidation state, approximately 0.

For the purpose of this disclosure, the term "inorganic" relates to a material substantially free of carbon in the form or organic carbon or covalently bonded carbon compounds. Accordingly, compounds such as calcium carbonate or sodium bicarbonate are considered inorganic materials while most organic compounds including small molecules such as methane, ethane, ethylene, propylene, related polymer species, etc., are commonly considered organic materials.

A "mineral" is defined as an element or chemical compound that is normally crystalline and that has been formed as a result of geological processes (Ernest H. Nickel, 1995, *The definition of a mineral*, The Canadian Mineralogist, vol. 33, pp. 689-690). For the purpose of this invention, the term "non-metal, inorganic or mineral" (mineral) is defined, as above, as an element or chemical compound that is normally crystalline and that has been formed as a result of geological processes.

Particle Morphology Index

The interfacial modification technology depends on the ability to isolate the particles from that of the continuous polymer phase. The isolation of the particulates requires placement of a continuous molecular layer(s) of interfacial modifier to be distributed over the surface of the particles. Once this layer is applied, the behavior at the interface of the interfacial modifier to polymer dominates the physical properties of the composite (e.g. tensile and elongation behavior) while the bulk nature of the particle dominates the bulk material characteristics of the composite (e.g. density, thermal conductivity, compressive strength). The correlation of particulate bulk properties to that of the final composite is especially strong due to the high volume percentage loadings of particulate phase associated with the technology.

There are two key attributes of the particle surface that dictate the ability to be successfully interfacially modified: 1) The overall surface area of the particles on a large scale; large being defined as about 100× or more compared to the molecular size of the interfacial modifier. In the case of NZ-12, the molecular diameter is about 2260 μm and 2) Particle surface characteristics that are on the order of the size of the interfacial modifier being applied.

The following particle morphology attributes specifically contribute to the ability to effectively interfacially modify the particles. Combining the different particle attributes we have derived a particle morphology index. Discussion will reveal that vastly different particle types can be effectively modified from large, smooth, round, and impervious surface types (low particle morphology index) to small, rough, irregular and porous (high particle morphology index):

Particle Size ($P_s$)

A wide range of particle sizes can be effectively interfacially modified. Successful modification has been completed with particles with a major dimension as small as −635 US mesh (<20 μm) to particles as large as −40US mesh (−425 μm). Undoubtedly, larger particle sizes can be effectively modified (1,500 μm or greater). The absolute size of the particle being modified is not important; the relative size of the major dimension of the largest particle to the minimum critical dimension of the end article is more important. Our composite experience guides us that the major dimension of the largest particles should not be more than $\frac{1}{5}^{th}$ of the minimum critical dimension of the end article.

As the particles become smaller the particulate surface area increases. For smooth spheres of a constant density, there is 28 times more surface area in spheres of 15 μm than 425 μm diameter within a given mass of material. There is 100 times the surface area for particles of 1,500 μm diameter compared to 15 μm.

Dosage levels of interfacial modifier have been effectively adjusted to compensate for changes in surface area due to particle size shifts.

Particle Shape/Aspect Ratio ($P_{sh}$)

The benefits of interfacial modification is independent of overall particle shape. Particles with an aspect ratio of 1 (hollow glass bubbles of iM30K and ceramic G200 microspheres) to 10 (some particularly irregularly shaped garnet) have been favorably interfacially modified. The current upper limit constraint is associated with challenges of successful dispersion of fibers within laboratory compounding equipment without significantly damaging the high aspect ratio fibers. Furthermore, inherent rheological challenges are associated with high aspect ratio fibers. With proper engineering, the ability to successfully compound and produce interfacially modify fibers of fiber fragments with aspect ratio in excess of 10 is envisioned.

At a given minor axis particle dimension, the relationship of particle aspect ratio to surface area is given by:

$$Sphere = \pi D^2; \text{ and}$$

$$ARobject = \pi D^2(r_a + 0.5);$$

wherein D is particle size ($P_s$) or diameter, $r_a$ is aspect ratio.

For a given minor dimension, the surface area of a particle with an aspect ratio of 10 has 10.5 times the surface area than a spherical particle. Dosage levels of interfacial modifier can be adjusted to compensate for the variance in surface area due to shape effects.

Particle Roughness ($P_r$)

Macroscopic particle roughness (defined here as 100× the diameter of the interfacial modifier) can be defined by the circularity of the particle. It has been shown that interfacially modified mineral or inorganic particulates with rough and substantially non-spherical shapes obtain the similar advantageous rheology and physical property results as regularly shaped particles. The circularity or roughness of the particle can be measured by microscopic inspection of the particles in which an automated or manual measurement of roughness can be calculated. In such a measurement, the perimeter of a representative selection of the particulate is selected and the area of the particle cross section is also measured. The circularity of the particle is calculated by the following formula:

$$Circularity = (perimeter)^2/area.$$

Such materials such as hollow glass bubbles have a circularity of $4\pi$ (for smooth spherical particles) to 50 (smooth particles with an aspect ratio of 10). Many inorganic and mineral particulate have an oblong, multi lobe, rough non-regular shape or aspect. Such materials have a circularity of 13 to 35 or 13 to 30 and obtain the improved viscoelastic properties of the invention. Using proper optical and image analysis techniques the decoupling of surface roughness and aspect ratio can be determined under the appropriate magnification to quantify large scale particle roughness. The multiplier for the derivation of the particle morphology index must be adjusted for the aspect ratio of the particle.

An alternative to optical procedures consists of using a BET analysis to determine the specific surface area of the particulate phase. The specific surface area captures both the macroscopic particle roughness and particle porosity discussed below for particles of a specific particle size and shape distribution.

Particle Porosity ($P_p$)

The interfacial modifiers are quite large, on the order of a few hundred to a few thousand molecular weight. Within a class of compounds, the effective diameter of the modifier molecule is proportional to the molecular weight. The predicted diameter of the NZ-12 zirconate modifier is 2260 picometer with a molecular weight of 2616 g/mol. The minimum size of the modifier molecules would be about 400 picometer (assuming a molecular weight of 460 g/mol). The size of the titanate modifiers would be slightly smaller than the corresponding zirconate for a corresponding given organophosphate structure.

Literature review of BET surface analysis reveals a large difference in particle surface area of mineral particles (from 0.1 to >100 m$^2$·gm$^{-1}$). Nonporous spheres with a diameter of 1,500 micron results in a specific area of 0.017 m$^2$·gm$^{-1}$. In all cases, successful interfacial modification of the particulates is possible via changes in modifier loading. It is important to note that required increase in dosage is not directly proportional to the BET surface measurements. The pore size penetrable by the BET probing gas is significantly smaller (20.5 A$^2$ for krypton for example) than the interfacial modifier. Silica sand had a pore size of 0.90 nm as determined by BET analysis, the interfacial modifier molecule is able to bridge the pore opening. It will be possible to successfully interfacially modify porous absorbents such that the particles composite rheology is improved while absorbent properties of the particulate are maintained due to the relative size differences in the interfacial modifier (large), pore size being bridged (small), and the size of the absorbent molecule (nitrogen, argon, water, etc.) diffusing through the interfacial modifier into the absorbent particulate.

The particle morphology index is defined as:

$$PMI = (P_s)(P_{sh})(P_r)(P_p)$$

For large, spherical, smooth, non-porous particles the particle morphology index=1 to 200. For small, rough, porous particles with an aspect ratio of 10, the maximum particle morphology index=100×10.5×100/0.1=10$^6$. Certain particles with a range of particle size ($P_s$) or diameters and aspect ratios, some roughness and porosity can range from 200 to 10$^4$. Other particles with a broadened range of sizes or diameters and aspect ratios, substantial roughness and increased porosity can range from 2×10$^4$ to 10$^6$. The amount of interfacial modifier increases with the particle morphology index.

The result of the above particle attributes (particle size and distribution, particle shape, and roughness) results in a specific particle packing behavior. The relationship of these variables leads to a resultant packing fraction. Packing fraction is defined as:

$$P_f = P_d/d_{pync}$$

wherein $P_f$=packing fraction; $P_d$=packing density and $d_{pync}$=pycnometer density. The relationship of these variables upon particle packing behavior is well characterized and used within powdered metallurgy science. For the case of spherical particles, it is well known that particle packing increases when the size difference between large to small particles increases. With a size ratio of 73 parts by weight large particle:27 parts by weight small, monodispersed spheres with a 7:1 size ratio, the small particles can fit within interstitial spaces of the large particles resulting in a packing level of about 86 volume percent. In practice, it is not possible to attain monodispersed spheres. We have found that increased packing is best when using particles of broad particle size distribution with as large of a size difference between them as possible. In cases like these, we have found packing percentages approaching 80 volume %.

For composites containing high volumetric loading of spherical particles, the rheological behavior of the highly packed composites depends on the characteristics of the contact points between the particles and the distance between particles. When forming composites with polymeric volumes approximately equal to the excluded volume of the particulate phase, inter-particle interaction dominates the behavior of the material. Particles contact one another and the combination of interacting sharp edges, soft surfaces (resulting in gouging) and the friction between the surfaces prevent further or optimal packing. Interfacial modifying chemistries are capable of altering the surface of the particulate by coordination bonding, van der Waals forces, covalent bonding, or a combination of all three. The surface of the interfacially modified particle behaves as a particle of the interfacial modifier. These organics reduce the friction between particles preventing gouging and allowing for greater freedom of movement between particles. The benefits of utilizing particles in the aforementioned acceptable particle morphology index range does not become evident until packing to a significant proportion of the maximum packing fraction; this value is typically greater than approximately 40 volume % particle phase of the composite.

The spatial character of the particles of the invention can be defined by the circularity of the particle and by its aspect ratio. One surprising aspect of the invention is that even a particle that depart from smooth spherical particle shape and are non-spherical or have substantial aspect ratio are efficiently packed in the composite of the invention. Mineral or inorganic particulates with amorphous, rough and substantially non-spherical shapes obtain the same advantageous rheology as regularly shaped particles. The aspect ratio of the more regular particles of the invention should be less than 1:5 and often less than 1:1.5. Similarly, the particulate with an aspect ratio of less than 10 or about 5:1 also obtain the benefits of the composites of the invention.

We have found that the use of the interfacial modifier disclosed in this application obtains a close association of both spherical and substantially aspherical particles such that effective composites can be made even with particles that depart from the ideal spherical particle. Many inorganic or mineral particles, depending on source and processing can have a narrow particle size distribution, a very regular surface, a low aspect ratio and substantial secularity while other such particles can have a very amorphous non-regular geometry and surface characteristic. We have found that the processes of the invention and the composites made using the interfacial modifier of the invention can obtain useful composites from most particle species disclosed herein.

In the composites of the invention, the van der Waals' forces occur between collections of hollow glass microspheres that act as "molecules" in the form of crystals or other mineral particle aggregates. The composite of the invention is characterized by a composite having intermolecular forces between glass microsphere, non-metal, inorganic or mineral particulates that are in the range of van der Waals' strength, i.e., ranges and definitions if appropriate.

In a composite, the hollow glass microsphere is usually much stronger and stiffer than the matrix, and gives the composite its designed properties. The matrix holds the hollow glass microspheres in an orderly high-density pattern. Because the hollow glass microspheres are usually discontinuous, the matrix also helps to transfer load among the hollow glass microspheres. Processing can aid in the mixing and filling of the hollow glass microsphere in the composite. To aid in the mixture, a surface chemical reagent can help to overcome the forces that prevent the matrix from forming a substantially continuous phase of the composite. The tunable composite properties arise from the intimate association obtained by use of careful processing and manufacture. We believe a surface chemical reagent is an organic material that provides an exterior coating on the particulate promoting the close association of polymer and particulate. Minimal amounts of the interfacial modifier can be used including about 0.005 to 8 wt.-%, or about 0.02 to 3 wt. %. Higher amounts are used to coat materials with increased morphology.

Hollow glass spheres (including both hollow and solid) are a useful non-metal or inorganic particulate. These spheres are strong enough to avoid being crushed or broken during further processing of the polymeric compound, such as by high pressure spraying, kneading, extrusion or injection molding. In many cases these spheres have densities close to, but more or less, than that of the polymeric compound into which they are introduced in order that they distribute evenly within the compound upon introduction and mixing. Furthermore, it is desirable that these spheres be resistant to leaching or other chemical interaction with their associated polymeric compound. The method of expanding solid glass particles into hollow glass spheres by heating is well known. See, e.g., U.S. Pat. No. 3,365,315. Glass is ground to particulate form and then heated to cause the particles to become plastic and for gaseous material within the glass to act as a blowing agent to cause the particles to expand. During heating and expansion, the particles are maintained in a suspended state either by directing gas currents under them or allowing them to fall freely through a heating zone. Sulfur, or compounds of oxygen and sulfur, serves as the principal blowing agent.

A number of factors affect the density, size, strength, chemical durability and yield (the percentage by weight or volume of heated particles that become hollow) of hollow glass spheres. These factors include the chemical composition of the glass; the sizes of the particles fed into the furnace; the temperature and duration of heating the particles; and the chemical atmosphere (e.g., oxidizing or reducing) to which the particles are exposed during heating. The percentage of silica ($SiO_2$) in glass used to form hollow glass spheres should be between 65 and 85 percent by weight and that a weight percentage of $SiO_2$ below 60 to 65 percent would drastically reduce the yield of the hollow spheres.

Useful hollow glass spheres having average densities of about 0.1 grams-$cm^{-3}$ to approximately 0.7 grams-$cm^{-3}$ or about 0.125 grams-$cm^{-3}$ to approximately 0.6 grams-$cm^{-3}$ are prepared by heating solid glass particles.

For a product of hollow glass spheres having a particular desired average density, there is an optimum sphere range of sizes of particles making up that product which produces the maximum average strength. A combination of a larger and a smaller hollow glass sphere wherein there is about 0.1 to 25 wt. % of the smaller sphere and about 99.9 to about 75 wt. % of larger particles can be used were the ratio of the particle size ($P_s$) of the larger particles to the ratio of the smaller is about 2-7:1.

Hollow glass spheres used commercially can include both solid and hollow glass spheres. All the particles heated in the furnace do not expand, and most hollow glass-sphere products are sold without separating the hollow from the solid spheres.

Preferred hollow glass spheres are hollow spheres with relatively thin walls. Such spheres typically comprise a silica-line-oral silicate hollow glass and in bulk form appear to be a white powdery particulate. The density of the hollow spherical materials tends to range from about 0.1 to 0.8 g/cc this substantially water insoluble and has an average particle size ($P_s$) that ranges from about 10 to 250 microns.

In the past, an inorganic hollow glass sphere has been used in polymers such as nylon, ABS, or polycarbonate compositions or alloys thereof. In nylons, at a particulate loading ranges from a few percent to as much as 20 vol. %, however, in our view, the prior art inorganic materials become brittle and lose their viscoelastic character as the volume percentage of particulate exceeds 20 or 25 vol. %. In Applicants compositions, the materials maintain both an effective composite formation of loadings of greater than 20% but also maintain substantial viscoelasticity and polymer characteristics at polymer loadings that range greater than 25 vol. %, greater than 35 vol. %, greater than 40 vol. % and typically range from about 40 vol. % to as much as 95 vol. %. In these ranges of particulate loading, the composites in the application maintain the viscoelastic properties of the polymer in the polymer phase. As such within these polymer loadings, Applicants have obtained useful elongation at break wherein the elongations can be inaccessive 5%, inaccessive 10%, inaccessive 20%, and can range from about 20 to 500% elongation at break. Further, the tensile yield point can substantially exceed the prior art materials and can range from about 5 to 10% elongation.

Typically, the composite materials of the invention are manufactured using melt processing and are also utilized in product formation using melt processing. A typical thermoplastic polymer material, is combined with particulate and processed until the material attains (e.g.) a uniform density (if density is the characteristic used as a determinant). Alternatively, in the manufacture of the material, the non-metal, inorganic or mineral or the thermoplastic polymer may be blended with interfacial modification agents and the modified materials can then be melt processed into the material. Once the material attains a sufficient property, such as, for example, density, the material can be extruded into a product or into a raw material in the form of a pellet, chip, wafer, proform or other easily processed material using conventional processing techniques.

In the manufacture of useful products with the composites of the invention, the manufactured composite can be obtained in appropriate amounts, subjected to heat and pressure, typically in extruder equipment and then formed into an appropriate shape having the correct amount of materials in the appropriate physical configuration. In the appropriate product design, during composite manufacture or during product manufacture, a pigment or other dye material can be added to the processing equipment. One advantage of this material is that an inorganic dye or pigment can be co-processed resulting in a material that needs no exterior painting or coating to obtain an attractive, functional, or decorative appearance. The pigments can be included in the polymer blend, can be uniformly distributed throughout the material and can result in a surface that cannot chip, scar or lose its decorative appearance. One particularly important pigment material comprises titanium dioxide ($TiO_2$). This material is non-toxic, is a bright white particulate that can be easily combined with either non-metal, inorganic or mineral particulates and/or polymer composites to enhance the novel characteristics of the composite material and to provide a white hue to the ultimate composite material.

We have further found that a blend of two, three or more non-metal, inorganic or minerals in particulate form can, obtain important composite properties from all of non-metal, inorganic or minerals in a polymer composite structure. Such composites each can have unique or special properties. These composite processes and materials have the unique capacity and property that the composite acts as blended composite of two or three different non-metal, inorganic or minerals that could not, due to melting point and other processing difficulties, be made into a blend without the methods of the invention.

A large variety of polymer materials can be used in the composite materials of the invention. For the purpose of this application, a polymer is a general term covering either a thermoset or a thermoplastic. We have found that polymer materials useful in the invention include both condensation polymeric materials and addition or vinyl polymeric materials. Included are both vinyl and condensation polymers, and polymeric alloys thereof. Vinyl polymers are typically manufactured by the polymerization of monomers having an ethylenically unsaturated olefinic group. Condensation polymers are typically prepared by a condensation polymerization reaction which is typically considered to be a stepwise chemical reaction in which two or more molecules combined, often but not necessarily accompanied by the separation of water or some other simple, typically volatile substance. Such polymers can be formed in a process called polycondensation. The polymer has a density of at least 0.85 $gm\text{-}cm^{-3}$, however, polymers having a density of greater than 0.96 are useful to enhance overall product density. A density is often up to 1.7 or up to 2 $gm\text{-}cm^{-3}$ or can be about 1.5 to 1.95 $gm\text{-}cm^{-3}$.

Vinyl polymers include polyethylene, polypropylene, polybutylene, acrylonitrile-butadiene-styrene (ABS), polybutylene copolymers, polyacetyl resins, polyacrylic resins, homopolymers or copolymers comprising vinyl chloride, vinylidene chloride, fluorocarbon copolymers, etc. Condensation polymers include nylon, phenoxy resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials.

Condensation polymers that can be used in the composite materials of the invention include polyamides, polyamide-imide polymers, polyarylsulfones, polycarbonate, polybutylene terephthalate, polybutylene naphthalate, polyetherimides, polyethersulfones, polyethylene terephthalate, thermoplastic polyamides, polyphenylene ether blends, polyphenylene sulfide, polysulfones, thermoplastic polyurethanes and others. Preferred condensation engineering polymers include polycarbonate materials, polyphenyleneoxide materials, and polyester materials including polyethylene terephthalate, polybutylene terephthalate, polyethylene naphthalate and polybutylene naphthalate materials.

Polycarbonate engineering polymers are high performance, amorphous engineering thermoplastics having high impact strength, clarity, heat resistance and dimensional stability. Polycarbonates are generally classified as a polyester or carbonic acid with organic hydroxy compounds. The most common polycarbonates are based on phenol A as a hydroxyl compound copolymerized with carbonic acid. Materials are often made by the reaction of a biphenyl A with phosgene ($O=CCl_2$). Polycarbonates can be made with phthalate monomers introduced into the polymerization extruder to improve properties such as heat resistance, further trifunctional materials can also be used to increase melt strength or extrusion blow molded materials. Polycarbonates can often be used as a versatile blending material as a component with other commercial polymers in the manufacture of alloys. Polycarbonates can be combined with polyethylene terephthalate acrylonitrile-butadiene-styrene, styrene maleic anhydride and others. Preferred alloys comprise a styrene copolymer and a polycarbonate. Preferred polycarbonate materials should have a melt index between 0.5 and 7, preferably between 1 and 5 gms/10 min.

A variety of polyester condensation polymer materials including polyethylene terephthalate, polybutylene terephthalate, polyethylene naphthalate, polybutylene naphthalate, etc. can be useful in the composites of the invention. Polyethylene terephthalate and polybutylene terephthalate are high performance condensation polymer materials. Such polymers often made by a copolymerization between a diol (ethylene glycol, 1,4-butane diol) with dimethyl terephthalate. In the polymerization of the material, the polymerization mixture is heated to high temperature resulting in the transesterification reaction releasing methanol and resulting in the formation of the engineering plastic. Similarly, polyethylene naphthalate and polybutylene naphthalate materials can be made by copolymerizing as above using as an acid source, a naphthalene dicarboxylic acid. The naphthalate thermoplastics have a higher Tg and higher stability at high temperature compared to the terephthalate materials. However, all these polyester materials are useful in the composite materials of the invention. Such materials have a preferred molecular weight characterized by melt flow properties. Useful polyester materials have a viscosity at 265° C. of about 500-2000 cP, preferably about 800-1300 cP.

Polyphenylene oxide materials are engineering thermoplastics that are useful at temperature ranges as high as 330° C. Polyphenylene oxide has excellent mechanical properties, dimensional stability, and dielectric characteristics. Commonly, phenylene oxides are manufactured and sold as polymer alloys or blends when combined with other polymers or fiber. Polyphenylene oxide typically comprises a homopolymer of 2,6-dimethyl-1-phenol. The polymer commonly known as poly(oxy-(2,6-dimethyl-1,4-phenylene)). Polyphenylene is often used as an alloy or blend with a polyamide, typically nylon 6-6, alloys with polystyrene or high impact styrene and others. A preferred melt index (ASTM 1238) for the polyphenylene oxide material useful in the invention typically ranges from about 1 to 20, preferably about 5 to 10 gm/10 min. The melt viscosity is about 1000 cP at 265° C.

Another class of thermoplastic include styrenic copolymers. The term styrenic copolymer indicates that styrene is copolymerized with a second vinyl monomer resulting in a vinyl polymer. Such materials contain at least a 5 mol-% styrene and the balance being 1 or more other vinyl monomers. An important class of these materials are styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitriles (ASA polymer materials) are known. These materials are somewhat softer than unmodified SAN's and are ductile, opaque, two phased terpolymers that have surprisingly improved weatherability.

ASA polymers are random amorphous terpolymers produced either by mass copolymerization or by graft copolymerization. In mass copolymerization, an acrylic monomer styrene and acrylonitrile are combined to form a heteric terpolymer. In an alternative preparation technique, styrene acrylonitrile oligomers and monomers can be grafted to an acrylic elastomer backbone. Such materials are characterized as outdoor weatherable and UV resistant products that provide excellent accommodation of color stability property retention and property stability with exterior exposure. These materials can also be blended or alloyed with a variety of other polymers including polyvinyl chloride, polycarbonate, polymethyl methacrylate and others. An important class of styrene copolymers includes the acrylonitrile-butadiene-styrene monomers. These polymers are very versatile family of engineering thermoplastics produced by copolymerizing the three monomers. Each monomer provides an important property to the final terpolymer material. The final material has excellent heat resistance, chemical resistance and surface hardness combined with processability, rigidity and strength. The polymers are also tough and impact resistant. The styrene copolymer family of polymers have a melt index that ranges from about 0.5 to 25, preferably about 0.5 to 20.

An important class of engineering polymers that can be used in the composites of the invention include acrylic polymers. Acrylics comprise a broad array of polymers and copolymers in which the major monomeric constituents are an ester acrylate or methacrylate. These polymers are often provided in the form of hard, clear sheet or pellets. Acrylic monomers polymerized by free radical processes initiated by typically peroxides, azo compounds or radiant energy. Commercial polymer formulations are often provided in which a variety of additives are modifiers used during the polymerization provide a specific set of properties for certain applications. Pellets made for polymer grade applications are typically made either in bulk (continuous solution polymerization), followed by extrusion and pelleting or continuously by polymerization in an extruder in which unconverted monomer is removed under reduced pressure and recovered for recycling. Acrylic plastics are commonly made by using methyl acrylate, methylmethacrylate, higher alkyl acrylates and other copolymerizable vinyl monomers. Preferred acrylic polymer materials useful in the composites of the invention has a melt index of about 0.5 to 50, preferably about 1 to 30 gm/10 min.

Vinyl polymer polymers include a acrylonitrile; polymer of alpha-olefins such as ethylene, propylene, etc.; chlorinated monomers such as vinyl chloride, vinylidene dichloride, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

Polymer blends or polymer alloys can be useful in manufacturing the pellet or linear extrudate of the invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature (Tg). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The primary requirement for the substantially thermoplastic engineering polymer material is that it retains sufficient thermoplastic properties such as viscosity and stability, to permit melt blending with a particulate, permit formation of linear extrudate pellets, and to permit the composition material or pellet to be extruded or injection molded in a thermoplastic process forming the useful product. Engineering polymer and polymer alloys are available from a number of manufacturers including Dyneon LLC, B.F. Goodrich, G.E., Dow, and duPont.

Polyester polymers are manufactured by the reaction of a dibasic acid with a glycol. Dibasic acids used in polyester production include phthalic anhydride, isophthalic acid, maleic acid and adipic acid. The phthalic acid provides stiffness, hardness and temperature resistance; maleic acid provides vinyl saturation to accommodate free radical cure; and adipic acid provides flexibility and ductility to the cured polymer. Commonly used glycols are propylene glycol which reduces crystalline tendencies and improves solubility in styrene. Ethylene glycol and diethylene glycol reduce crystallization tendencies. The diacids and glycols are condensed eliminating water and are then dissolved in a vinyl monomer to a suitable viscosity. Vinyl monomers include styrene, vinyltoluene, paramethylstyrene, methylmethacrylate, and diallyl phthalate. The addition of a polymerization initiator, such as hydroquinone, tertiary butylcatechol or phenothiazine extends the shelf life of the uncured polyester polymer. Polymers based on phthalic anhydride are termed orthophthalic polyesters and polymers based on isophthalic acid are termed isophthalic polyesters. The viscosity of the unsaturated polyester polymer can be tailored to an application. Low viscosity is important in the fabrication of fiber-reinforced composites to ensure good wetting and subsequent high adhesion of the reinforcing layer to the underlying substrate. Poor wetting can result in large losses of mechanical properties. Typically, polyesters are manufactured with a styrene concentration or other monomer concentration producing polymer having an uncured viscosity of 200-1,000 mPa·s(cP). Specialty polymers may have a viscosity that ranges from about 20 cP to 2,000 cP. Unsaturated polyester polymers are typically cured by free radical initiators commonly produced using peroxide materials. Wide varieties of peroxide initiators are available and are commonly used. The peroxide initiators thermally decompose forming free radical initiating species.

Phenolic polymers can also be used in the manufacture of the structural members of the invention. Phenolic polymers typically comprise a phenol-formaldehyde polymer. Such polymers are inherently fire resistant, heat resistant and are low in cost. Phenolic polymers are typically formulated by blending phenol and less than a stoichiometric amount of formaldehyde. These materials are condensed with an acid catalyst resulting in a thermoplastic intermediate polymer called NOVOLAK. These polymers are oligomeric species terminated by phenolic groups. In the presence of a curing agent and optional heat, the oligomeric species cure to form a very high molecular weight thermoset polymer. Curing agents for novalaks are typically aldehyde compounds or methylene (—$CH_2$—) donors. Aldehydic curing agents include paraformaldehyde, hexamethylenetetramine, formaldehyde, propionaldehyde, glyoxal and hexamethylmethoxy melamine.

The fluorocarbon polymers useful in this invention are perflourinated and partially fluorinated polymers made with monomers containing one or more atoms of fluorine, or copolymers of two or more of such monomers. Common examples of fluorinated monomers useful in these polymers or copolymers include tetrafluoroethylene (TFE), hexafluoropropylene(HFP), vinylidene fluoride (VDF), perfluoroalkylvinyl ethers such as perfluoro-(n-propyl-vinyl) ether (PPVE) or perfluoromethylvinylether (PMVE). Other copolymerizable olefinic monomers, including non-fluorinated monomers, may also be present.

Particularly useful materials for the fluorocarbon polymers are TFE-HFP-VDF terpolymers (melting temperature of about 100 to 260° C.; melt flow index at 265° C. under a 5 kg load is about 1-30 g-10 $min^{-1}$), hexafluoropropylene-tetrafluoroethylene-ethylene (HTE) terpolymers (melting temperature about 150 to 280° C.; melt flow index at 297° C. under a 5 kg load of about 1-30 g-10 $min^{-1}$), ethylene-tetrafluoroethylene (ETFE) copolymers (melting temperature about 250 to 275° C.; melt flow index at 297° C. under a 5 kg load of about 1-30 g-10 $min^{-1}$), hexafluoropropylene-tetrafluoroethylene (FEP) copolymers (melting temperature about 250 to 275° C.; melt flow index at 372° C. under a 5 kg load of about 1-30 g-10 $min^{-1}$.), and tetrafluoroethylene-perfluoro(alkoxy alkane) (PFA) copolymers (melting temperature about 300 to 320° C.; melt flow index at 372° C. under a 5 kg load of about 1-30 g-10 $min^{-1}$.). Each of these fluoropolymers is commercially available from Dyneon LLC, Oakdale, Minn. The TFE-HFP-VDF terpolymers are sold under the designation "THV".

Also useful are vinylidene fluoride polymers primarily made up of monomers of vinylidene fluoride, including both homo polymers and copolymers. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, and any other monomer that readily copolymerizes with vinylidene fluoride. These materials are further described in U.S. Pat. No. 4,569,978 (Barber) incorporated herein by reference. Preferred copolymers are those composed of from at least about 70 and up to 99 mole percent vinylidene fluoride, and correspondingly from about 1 to 30 percent tetrafluoroethylene, such as disclosed in British Patent No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 percent trifluoroethylene Terpolymers of vinylidene fluoride, trifluoroethylene and tetrafluoroethylene such as described in U.S. Pat. No. 2,968,649 and terpolymers of vinylidene fluoride, trifluoroethylene and tetrafluoroethylene are also representative of the class of vinylidene fluoride copolymers which are useful in this invention. Such materials are commercially available under the KYNAR trademark from Arkema Group located in King of Prussia, Pa. or under the DYNEON trademark from Dyneon LLC of Oakdale, Minn.

Fluorocarbon elastomer materials can also be used in the composite materials of the invention. Fluorocarbon elastomers contain $VF_2$ and HFP monomers and optionally TFE and have a density greater than 1.8 gm-$cm^{-1}$; these polymers exhibit good resistance to most oils, chemicals, solvents, and halogenated hydrocarbons, and excellent resistance to ozone, oxygen, and weathering. Their useful application temperature range is −40° C. to 300° C. Fluorocarbon elastomer examples include those described in detail in Lentz, U.S. Pat. No. 4,257,699, as well as those described in Eddy et al., U.S. Pat. No. 5,017,432 and Ferguson et al., U.S. Pat. No. 5,061,965. The disclosures of each of these patents are totally incorporated herein by reference.

Latex fluorocarbon polymers are available in the form of the polymers comprising the PFA, FEP, ETFE, HTE, THV and PVDF monomers. Fluorinated poly(meth)acrylates can generally be prepared by free radical polymerization either neat or in solvent, using radical initiators well known to those skilled in the art. Other monomers which can be copolymerized with these fluorinated (meth)acrylate monomers include alkyl (meth)acrylates, substituted alkyl (meth)acrylates, (meth)acrylic acid, (meth)acrylamides, styrenes, vinyl halides, and vinyl esters. The fluorocarbon polymers can comprise polar constituents. Such polar groups or polar group containing monomers may be anionic, nonionic, cationic, or amphoteric. In general, the more commonly employed polar groups or polar group-containing organic radicals include organic acids, particularly carboxylic acid, sulfonic acid and phosphonic acid; carboxylate salts, sulfonates, phosphonates, phosphate esters, ammonium salts, amines, amides, alkyl amides, alkyl aryl amides, imides, sulfonamides, hydroxymethyl, thiols, esters, silanes, and polyoxyalkylenes, as well as other organic radicals such as alkylene or arylene substituted with one or more of such polar groups. The latex fluorocarbon polymers described herein are typically aqueous dispersed solids but solvent materials can be used. The fluorocarbon polymer can combined with various solvents to form emulsion, solution or dispersion in a liquid form. Dispersions of fluoropolymers can be prepared using conventional emulsion polymerization techniques, such as described in U.S. Pat. Nos. 4,418, 186; 5,214,106; 5,639,838; 5,696,216 or *Modern Fluoropolymers*, Edited by John Scheirs, 1997 (particularly pp. 71-101 and 597-614) as well as assignees' copending patent application Ser. No. 01/03,195, filed Jan. 31, 2001.

The liquid forms can be further diluted in order to deliver the desired concentration. Although aqueous emulsions, solutions, and dispersions are preferred, up to about 50% of a cosolvent such as methanol, isopropanol, or methyl perfluorobutyl ether may be added. Preferably, the aqueous emulsions, solutions, and dispersions comprise less than about 30% cosolvent, more preferably less than about 10% cosolvent, and most preferably the aqueous emulsions, solutions, and dispersions are substantially free of cosolvent.

Interfacial modifiers provide the close association of the particle with the polymer. Interfacial modifiers used in the non-reactive or non-crosslinking application fall into broad categories including, for example, stearic acid derivatives, titanate compounds, zirconate compounds, phosphonate compounds, aluminate compounds. Aluminates, phosphonates, titanates and zirconates useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. Preferably the titanates and zirconates contain from about 2 to about 3 ligands comprising hydrocarbyl phosphate esters and/or hydrocarbyl sulfonate esters, preferably 3 of such ligands and about 1 to 2 hydrocarbyl ligands, preferably 1 hydrocarbyl ligand.

The choice of interfacial modifiers is dictated by particulate, polymer, and application. The particle is coated even if having substantial morphology. The maximum density of a composite is a function of the densities of the materials and the volume fractions of each. Higher density composites are achieved by maximizing the per unit volume of the materials with the highest densities. The materials are almost exclusively refractory metals such as tungsten or osmium. These materials are extremely hard and difficult to deform, usually resulting in brittle fracture. When compounded with deformable polymeric binders, these brittle materials may be formed into usable shapes using traditional thermoplastic equipment. However, the maximum densities achievable will be less then optimum. When forming composites with polymeric volumes approximately equal to the excluded volume of the filler, inter-particle interaction dominates the behavior of the material. Particles contact one another and the combination of interacting sharp edges, soft surfaces (resulting in gouging, points are usually work hardened) and the friction between the surfaces prevent further or optimal packing. Therefore, maximizing properties is a function of softness of surface, hardness of edges, point size of point (sharpness), surface friction force and pressure on the material, circularity, and the usual, shape size distribution. Because of this inter-particle friction, the forming pressure will decrease exponentially with distance from the applied force. Interfacially modifying chemistries are capable of modifying the surface of the dense filler by coordination bonding, van der Waals forces, covalent bonding, or a combination of all three. The surface of the particle behaves as a particle of the interfacial modifier. These organics reduce the friction between particles preventing gouging and allowing for greater freedom of movement between particles. These phenomenon allow the applied shaping force to reach deeper into the form resulting in a more uniform pressure gradient.

Preferred titanates and zirconates include isopropyl tri (dioctyl)pyrophosphato titanate (available from Kenrich Chemicals under the designation KR38S), neopentyl(diallyl)oxy, tri(dodecyl)benzene-sulfonyl titanate (available from Kenrich Chemicals under the trademark and designation LICA 09), neopentyl(diallyl)oxy, trioctylphosphato titanate (available from Kenrich Chemicals under the trademark and designation LICA 12), neopentyl(diallyl)oxy, tri (dodecyl)benzene-sulfonyl zirconate (available from Kenrich Chemicals under the designation NZ 09), neopentyl (diallyl)oxy, tri(dioctyl)phosphato zirconate (available from Kenrich Chemicals under the designation NZ 12), and neopentyl(diallyl)oxy, tri(dioctyl)pyro-phosphato zirconate (available from Kenrich Chemicals under the designation NZ 38). The most preferred titanate is tri(dodecyl)benzene-sulfonyl titanate (available from Kenrich Chemicals under the designation LICA 09). The interfacial modifiers modify the particulate in the composites of the invention with the formation of a layer on the surface of the particle reducing the intermolecular forces, improving the tendency of the polymer mix with the particle, and resulting in increased composite density. Density is maximized as the number of close association between the particulate surface and polymer is maximized.

Thermosetting polymers can be used in an uncured form to make the composites with the interfacial modifiers. Once the composite is formed the reactive materials can chemically bond the polymer phase if a thermoset polymer is selected. The reactive groups in the thermoset can include methacrylyl, styryl, or other unsaturated or organic materials.

Thermoplastics include polyvinylchloride, polyphenylene sulfite, acrylic homopolymers, maleic anhydride containing polymers, acrylic materials, vinyl acetate polymers, diene containing copolymers such as 1,3-butadiene, 1,4-pentadiene, halogen or chlorosulfonyl modified polymers or other polymers that can react with the composite systems of the invention. Condensation polymeric thermoplastics can be used including polyamides, polyesters, polycarbonates, polysulfones and similar polymer materials by reacting end groups with silanes having aminoalkyl, chloroalkyl, isocyanato or similar functional groups.

The manufacture of the particulate composite materials depends on good manufacturing technique. Often the particulate is initially treated with an interfacial modifier by spraying the particulate with a solution of interfacial modifier on the particle with blending and drying carefully to ensure uniform particulate coating. interfacial modifier can also be added to particles in bulk blending operations using high intensity Littleford or Henschel blenders. Alternatively, twin cone mixers can be followed by drying or direct addition to a screw compounding device. Interfacial modifiers may also be reacted with the particulate in aprotic solvent such as toluene, tetrahydrofuran, mineral spirits or other such known solvents.

The particulate can be interfacially combined into the polymer phase depending on the nature of the polymer phase, the filler, the particulate surface chemistry and any pigment process aid or additive present in the composite material. In general, the mechanism used to couple particulate to polymer include solvation, chelation, coordination bonding (ligand formation), etc. Typically, however, covalent bonds, linking the particle or interfacial modifier, and the polymer is not formed. Titanate, phosphonate or zirconate agents can be used. Such agents have the following formula:

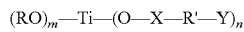

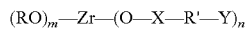

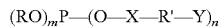

wherein R and R' are independently a hydrocarbyl, C1-C12 alkyl group or a C7-20 alkyl or alkaryl group wherein the alkyl or alkaryl groups may optionally contain one or more oxygen atoms or unsaturation; X is sulfate or phosphate; Y is H or any common substituent for alkyl or aryl groups; m and n are 1 to 3. Titanates provide antioxidant properties and can modify or control cure chemistry. Zirconate provides excellent bond strength but maximizes curing, reduces formation of off color in formulated thermoplastic materials. A useful zirconate material is neopentyl(diallyl) oxy-tri (dioctyl) phosphato-zirconate.

The composite materials having the desired physical properties can be manufactured as follows. In a preferred mode, the surface of the particulate is initially prepared, the interfacial modifier is coated on the prepared particle material, and the resulting product is isolated and then combined with the continuous polymer phase to affect an interfacial association between the particulate and the polymer. Once the composite material is prepared, it is then formed into the desired shape of the end use material. Solution processing is an alternative that provides solvent recovery during materials processing. The materials can also be dry-blended without solvent. Blending systems such as ribbon blenders obtained from Drais Systems, high density drive blenders available from Littleford Brothers and Henschel are possible. Further melt blending using Banberry, veferralle single screw or twin screw compounders is also useful. When the materials are processed as a plastisol or organosol with solvent, liquid ingredients are generally charged to a processing unit first, followed by polymer polymer, particulate and rapid agitation. Once all materials are added a vacuum can be applied to remove residual air and solvent, and mixing is continued until the product is uniform and high in density.

Dry blending is generally preferred due to advantages in cost. However certain embodiments can be compositionally unstable due to differences in particle size. In dry blending processes, the composite can be made by first introducing the polymer, combining the polymer stabilizers, if necessary, at a temperature from about ambient to about 60° C. with the polymer, blending a particulate (modified if necessary) with the stabilized polymer, blending other process aids, interfacial modifier, colorants, indicators or lubricants followed by mixing in hot mix, transfer to storage, packaging or end use manufacture.

Interfacially modified materials can be made with solvent techniques that use an effective amount of solvent to initiate formation of a composite. When interfacial treatment is substantially complete, the solvent can be stripped. Such solvent processes are conducted as follows:

1) Solvating the interfacial modifier or polymer or both;
2) Mixing the particulate into a bulk phase or polymer master batch: and
3) Devolatilizing the composition in the presence of heat & vacuum above the Tg of the polymer.

When compounding with twin screw compounders or extruders, a preferred process can be used involving twin screw compounding as follows.

1. Add particulate and raise temperature to remove surface water (barrel 1).
2. Add interfacial modifier to twin screw when filler is at temperature (barrel 3).
3. Disperse/distribute surface chemical treatment on particulate.
4. Maintain temperature to completion.
5. Vent by-products (barrel 6).
6. Add polymer binder (barrel 7).
7. Compress/melt polymer binder.
8. Disperse/distribute polymer binder in particulate.
9. Combine modified particulate with polymer binder.
10. Vacuum degas remaining products (barrel 9).
11. Compress resulting composite.
12. Form desired shape, pellet, lineal, tube, injection mold article, etc. through a die or post-manufacturing step.

Alternatively in formulations containing small volumes of continuous phase:

1. Add polymer binder.
2. Add interfacial modifier to twin screw when polymer binder is at temperature.
3. Disperse/distribute interfacial modifier in polymer binder.
4. Add filler and disperse/distribute particulate.
5 Raise temperature
6. Maintain temperature to completion.
7. Compress resulting composite.
8. Form desired shape, pellet, lineal, tube, injection mold article, etc. through a die or post-manufacturing step.

Certain selections of polymers and particulates may permit the omission of the interfacial modifier and their related processing steps.

EXPERIMENTAL SECTION

THV220A (Dyneon Polymers, Oakdale Minn.) is a polymer of tetrafluoroethylene, hexafluoropropylene, and vinylidene fluoride. The material is intended for extrusion applications, has a melting point of 120° C. and a specific gravity of 1.9 g/cc.

NZ 12 is neopentyl(diallyl)oxy-tri(dioctyl)phosphato-zirconate. It is available from KenRich Petrochemicals (Bayonne, N.J.). NZ12 has a specific gravity of 1.06 g/cc and is readily soluble in isopropyl alcohol (IPA).

Methods and Procedures

Powder Characterizations:

Powder characterization is completed to determine packing behavior of the powdered materials. Packing fraction is determined by dividing the packing density of the powder by the true density as determined via helium pycnometry. Packing fraction is defined as:

$$P_f = P_d/d_{pync}$$

wherein $P_f$=packing fraction; $P_d$=packing density and $d_{pync}$=pyncnometer density.

Packing density is determined by measuring the bulk powder weight within a volume. The packing density is commonly determined by placing the powder within a metallurgical press. The press setup is available from Buehler International (Lake Bluff, Ill.). For frangible materials, pressure is reduced to the appropriate level to reduce breakage of the powder particles thereby preventing artificially high packing density values. For very frangible materials, a tap density is used. The pycnometer density is determined by helium gas pycnometry (AccuPync 1330 manufactured by Micromeretics Corporation—Norcross, Ga.).

Application of Interfacial Modifier:

To interfacially modifiy particles at a lab scale, the interfacial modifier is first soluabilized with isopropyl alcohol (IPA). The IPA/modifier mixture is applied to the powdered material previously placed within a rotating stainless steel rotating cooking stock pot. The 3 gallon stainless steel cooking pot was coupled to a DC drive and motor for controlled rotation with the pot orientated at 30 degrees from horizontal. The IPA/modifier mixture is added along with additional IPA in enough volume to fully wet and flood the particles. The outer part of the pot is then heated externally with an industrial heat gun to volatize the IPA. After a sufficient time, the modified particles become free flowing—an indication that they are ready for compounding within our laboratory twin screw compounding equipment.

Compounding:

The polymer and modified particles are fed in appropriate ratios using K-tron K20 gravimetric weight loss feeders. The raw ingredients are fused together within a 19 mm B&P twin screw compounder. Barrel zone temperatures (5), screw speed, volumetric throughput, and die characteristics (number of openings and opening diameter) are varied depending on the nature of the particles and polymers being compounded. Commonly, torque, pressure, and melt temperature are monitored responses. A useful way to ensure the proper ratio of polymer and particulate(s) is to place compounded pellets into the heated metallurgical press; we call this the "puck density".

Extrusion:

The compounded products are extruded using 1" diameter extruder (Al-Be Industries, Fullerton, Calif.). Temperatures and volumetric throughput vary depending on the rheological behavior of the materials being extruded. Typically, motor amp load and extrusion pressures are monitored responses and used to gauge ease of extudability. For samples requiring characterization of tensile properties, the materials are extruded through a 19 mm×3 mm rectangular die plate onto a moving belt to minimize extrudate drawdown.

Tensile and Elongation:

ASTM Type IV dogbones were die cut from the extruded strips. The dog-bones were then tensile tested using a Lloyd Instruments universal testing machine produced by Ametek, Inc. A one-inch gauge length was used in the strain calculations. The cross-head speed was varied in an attempt to meet ASTM standards of tensile test duration lasting between 30 seconds and 3 minutes. A stress/strain curve was generated for the test samples.

Example 1

Hollow Glass Spheres

A supply of iM30k hollow glass bubbles were obtained from 3M Corporation (St. Paul, Minn.). The bubbles possess a density of approximately 0.6 g/cc. The bubbles were interfacailly modified with KR238S (KenRich Chemicals) with 4.8 parts of interfacial modifier to 100 parts particulate. The polymer phase was THV220 from Dyneon (St. Paul, Minn.). The bubbles were compounded into the polymer phase to a loading of 60 volume % hollow glass bubbles in the polymer phase. Samples were then extruded and ASTM tensile dogbones specimens made and tensile tested. Additionally, puck samples were made via the metallurgical press to confirm the formulations were near the targeted values.

Figure 2:
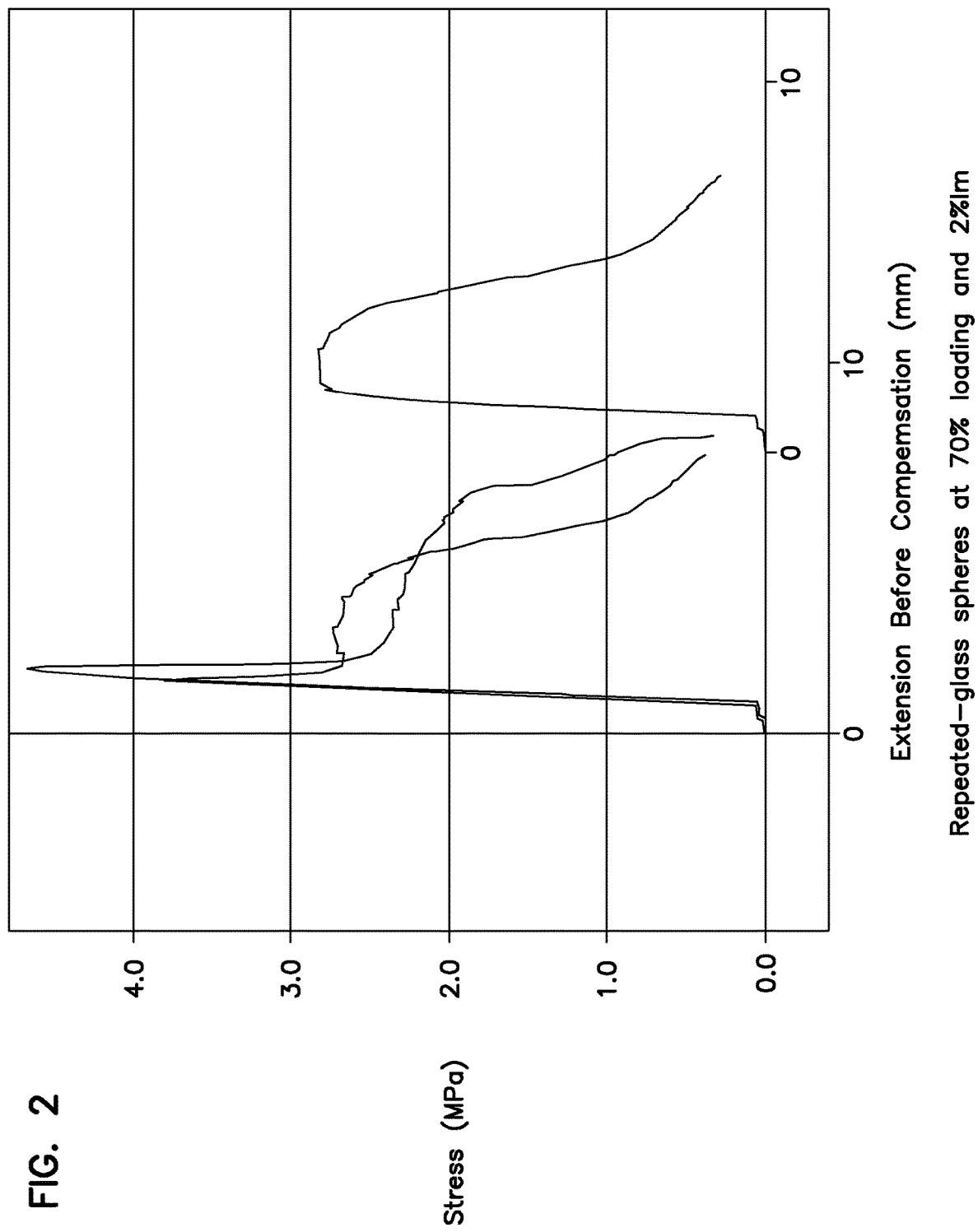
Figure 3:
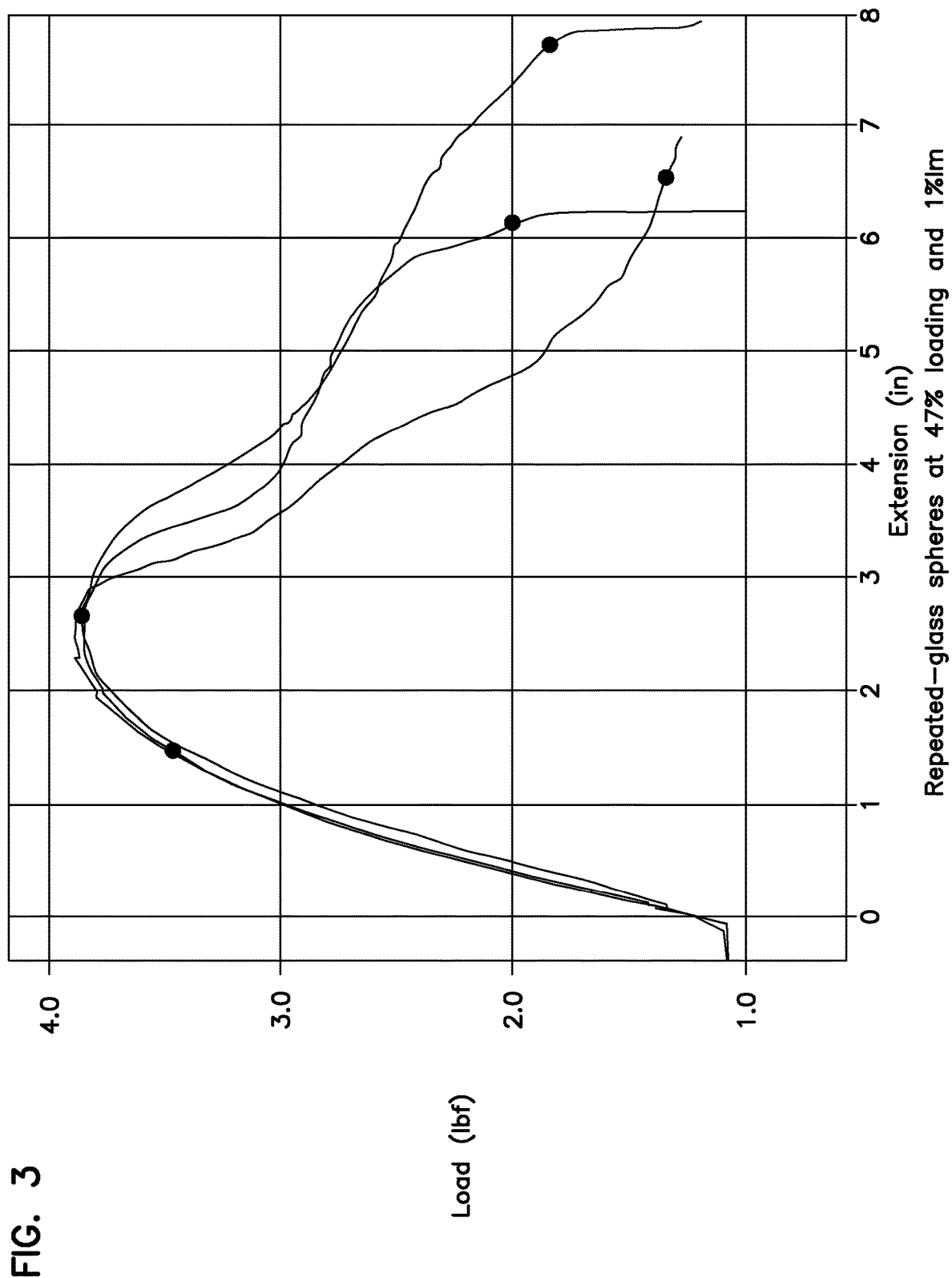

Obvious differences were apparent during compounding. The product without modifier was brown/tan in color exiting the die plate, indicating degradation of the material. Additionally, the bubbles did not feed well and bridged at the infeed throat of the machine. As a result, the volumetric throughput had to be reduced from 60 to 40 ml per minute. The puck density of the compounded product was 1.23 g/cc, indicating that many glass bubbles broke during compounding (a value of 1.10 g/cc would be obtained at the target loading without any glass bubble breakage). The composite products were brittle; failing at an elongation of about 0.3 inches (FIG. 2).

Figure 4:
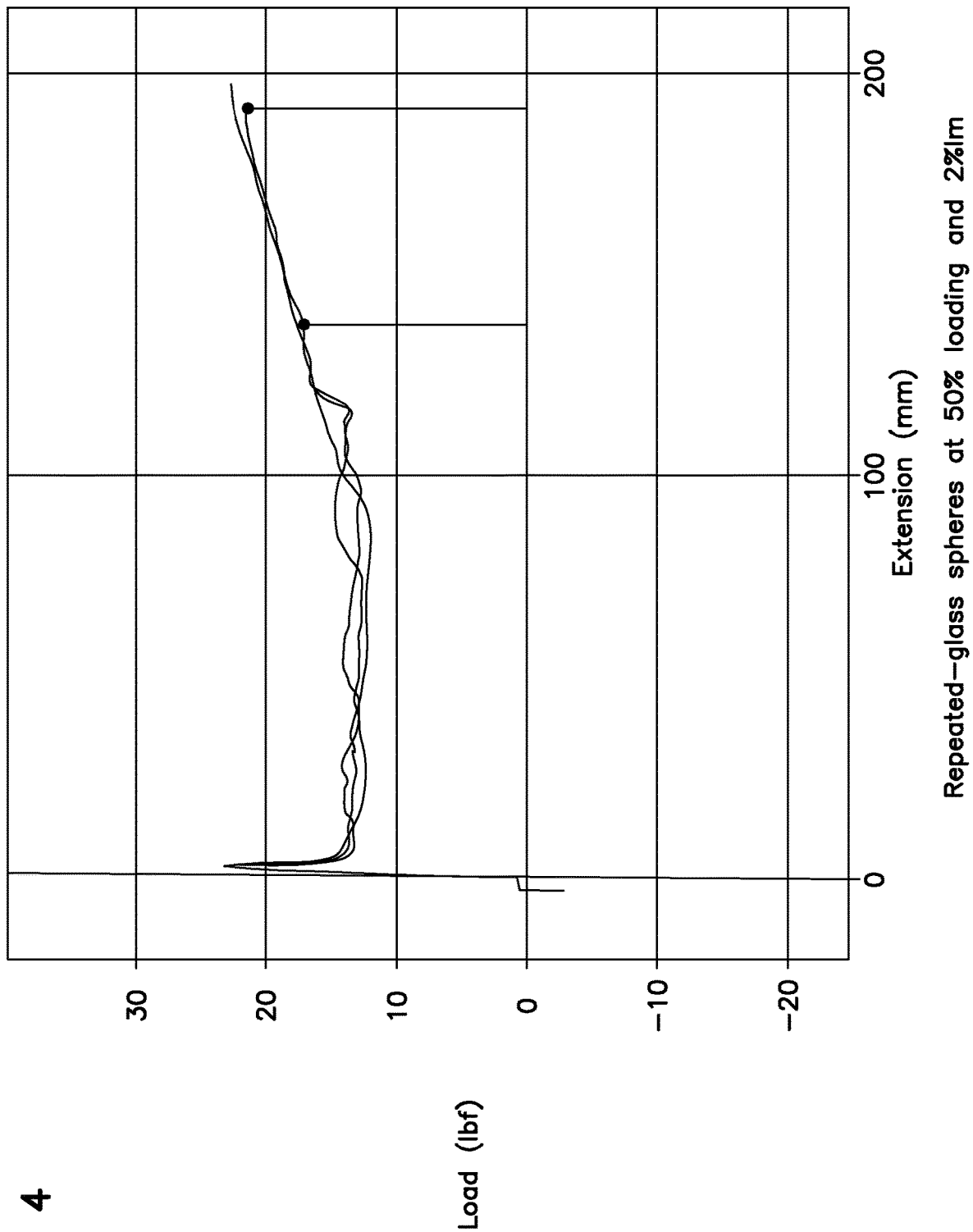

The composite containing the interfacially modified glass bubbles possessed lower density (1.15 g/cc vs 1.23 g/cc) indicating less bubbles broke during processing and that the final composite contained more intact glass bubbles than the composite with the unmodified bubbles. Additionally, the particles fed well into the throat of the compounder thereby allowing a volumetric throughput of 60 ml per minute to be maintained. The composite exiting the compounder die plate was white. The extruded composite was very flexible, elongating to about 5 to 8 inches at break (FIG. 4).

iM30k hollow glass bubbles were obtained from 3M Corporation (St. Paul, Minn.). The bubbles possessed a density of approximately 0.62 g/cc. The concept that successful loading of the hollow glass spheres at high volumetric loading within a composite would have exceptionally low density and possibly other benefits as well (namely low thermal and acoustical conduction etc.) was conceived. Varying levels of NZ-12 were applied to the glass beads at a range of 0 to 3 weight percent. Pellet compounding was completed on a 19 mm co-rotating twin screw extruder using our 3 hole die plate. Our feed rates were controlled sufficiently to get close to our targeted volumetric levels. Puck density calculations were used to confirm the ratio of the 0.6× specific gravity glass beads to the 1.9 specific gravity THV polymer and to back calculate the ratio of glass bead to polymer in the generated samples. Furthermore, we added the glass beads to the throat of the machine along with the polymer powder. As is commonly done, it would be beneficial to add the glass to molten polymer to reduce shear damage to the hollow spheres. The formulations were sensitive to residence time in the 19 mm compounder. The material would burn up almost immediately if it was not constantly moving through the machine. Extrusion was then completed using a 1 inch single screw extruder with the 19 mm×3 mm die profile. Temperatures settings were the same as typically used for compounding and extrusion of THV220A based formulations (185° C. flat temperature profile for compounding and Barrel-1=180° C., Barrel-2=150° C., Barrel-3=150° C., Die=150° C. for profile extrusion). Processing notes were taken throughout. ASTM Type-IV dog-bones were cut from the extruded strips and then tensile tested. The strain was normalized using a 1" gauge length. The following data in table 1 captures the results obtained with the glass sphere/THV composite materials.

TABLE 2

| | Example | | | | |
|---|---|---|---|---|---|
| | b | c | D | e | f |
| THV-220, gms | 50.0 | 55.0 | 55.0 | 55.00 | 55 |
| 3M iM30K Glass Beads, gms | 50.0 | 44.5 | 44.0 | 43.50 | 44 |
| Additive, gms | 0.0 | 0.5 | 1.0 | 1.5 | 1.0 |
| Additive on IM30K, % | 0.0 | 1.0 | 2.0 | 3.0 | 2.0 |
| Density of IM30K, gm/cc | 0.60 | | 0.62 | | 0.62 |
| Puck Density Extruded, gm/cc | | 1.33 | 1.28 | 1.28 | 1.11 |
| Predicted Vol % iM30k using a Density of 0.65 gm/cc for It | | 47 | 49 | 49 | 65 |
| Predicted Wgt % iM30k using a Density of 0.65 gm/cc for It | | 23 | 25 | 25 | 39 |
| Tensile at Yield, Mpa | Could | 6.1 | 5.1 | 4.7 | 5 |
| Elongation at Yield, % | not | 9.8 | 7.9 | 7.6 | 3 |
| Tensile at Break, Mpa | extrude | 6.1 | 4.8 | 4.3 | 2.5 |
| Elongation at Break, % | | 25 | 750 (825) | 590 (775) | 20 (225) |

In sample 3f, two passes were used to attain the desired glass bead packing level. This approach worked the best to get to the desired packing levels though potential damage to the glass is a concern. Samples 3d, 3e, and 3f were also tensile tested at a later date (approximately two months after being made) without negative changes to the elongation at break, see parenthesis in the above table).

At a volume packing of about 50% glass, a 2% loading of NZ-12 on the iM30k on the glass resulted in a composite with a high percentage strain to failure. Interestingly, the strain to failure of the highly loaded composite (sample 3f at approximately 65 volume % glass beads) exceeded that of a composite sample loaded to 47% glass treated with 1% modifier (sample 3c). See FIG. 3. The data indicate that the effect of the interfacial modifier is to increase the elasticity and compatibility of the glass and polymer. The aforementioned experiments reveal that the interfacial modifier alters the interfacial strength of the hollow glass spheres and the fluorocarbon polymer. A loading of 2% is needed at a volumetric packing level of about 50% to maintain favorable properties. See, FIG. 5. The results indicate that packing levels greater that 50% may be attained, but will require higher modifier loading levels to perform.

Hollow Glass Bubbles in Tire Sidewall Compounds

The standard tire sidewall rubber compound used in these experiments were prepared by and obtained from Continental Carbon Company of Houston, Tex. The hollow glass bubbles, iM30k, were obtained from 3M. The tire sidewall compound was first banded on a two roll mill and then the indicated amount of iM30k, either uncoated or coated, was added and mixed in to form the final compound. The coated iM30k was easiest to mix in the compound compared to the uncoated iM30k. The resulting compounds were evaluated for cure and physical properties according to the ASTM methods below with the results shown in below.

Cure rheology: Tests were run on uncured, compounded samples using an Alpha Technologies Moving Die Rheometer (MDR) Model 2000 in accordance with ASTM D5289-93a at 160 C, no preheat, 12 minutes elapsed time, and a 0.5 degree arc. Both the minimum torque (M(L)) and highest torque attained during a specified period of time when no plateau or maximum torque was obtained (M(H)) were measured. Also measured were the time for the torque to increase 2 units above M(L) ("t(s)2"), the time for the torque to reach a value equal to M(L)+0.5(M(H)−M(L)) ("t'50"), and the time for the torque to reach M(L)+0.9(M(H)−M(L)) ("t'90").

Press-Cure: Sample sheets measuring 150×150×2.0 mm were prepared for physical property determination by pressing at about 6.9 mega Pascal (MPa) for 10 minutes at 160 C, unless otherwise noted.

Physical properties: Tensile Strength at Break, Elongation at Break, and Modulus at various elongations were determined using ASTM D412-92 on samples cut from press-cured sheet with ASTM Die D. Units are reported in MPa.

Hardness: Samples were measured using ASTM D2240-85 Method A with a Type A(2) Shore Durometer. Units are reported in points on the Shore-A scale.

Tear Strength: Tear strength was determined using ASTM D624-00 on samples cut from the press-cured sheet with ASTM Die C. The units are reported in kN/m.

Tire Application

One aspect of the invention relates to a tire having a tire portion having a layer containing a composite formed by combining hollow glass microspheres, a rubber formulation and other conventional tire compounding components. The tire portion typically comprises an internal layer of the tire structure. One important tire structure can comprise is a tire sidewall or a tire tread portion. We have found that the combination of a hollow glass microsphere having a coating of an interfacial modifier, a rubber formulation and conventional tire compounding components can result in a tire with substantial structural integrity but with reduced weight. Enhanced fuel efficiency is often obtained from a variety of wheeled vehicles from physically lighter tires. We have found that an improved tire can contain an improved tire composition in the tire bead, sidewall or tread portion comprising a layer or a zone or a component of the tire comprising a dispersion of a hollow glass microsphere having an interfacial modifier coating in a tire rubber formulation. The interfacial modifier used in the improved tire formulations of the invention improves the association of the hollow glass microsphere with the rubber compounding formulation. This close association of a physical nature, that does not involve coupling or covalent binding, maximizes reduced weight while avoiding reducing the desirable properties of the rubber formulation. We have found that reactive or coupling agents that have the capability of forming covalent bonds with the rubber components and the hollow glass microspheres are not desirable since they tend to substantially reduce viscoelastic properties which in turn can reduce the utility lifetime and other beneficial aspects of the tire.

Conventional tire structures have a variety of materials in a number of forms. Tire tread is made of rubber compositions containing rubber reinforcing carbon black silica and other curative or structural materials. The tread material is formed on a tire carcass comprising flexible but similar rubber compositions in typically closely associated manufacturing techniques.

The tire of the invention is an assembly of numerous components that are built up in manufacturing equipment and then cured in a press under heat and pressure to form the final tire structure. Heat facilitates a polymerization reaction that cross-links rubber formulation into a useful rubber composition. The cured or volcanic polymers create an elastic quality that permits the tire to be compressed in an area of road contact but permit spring back to an original shape at low and high speeds. Tires are made of a number of individual components that are assembled into the final structure. The tire inner liner is an extruded rubber sheet compounded with additives at every level results in low air permeability. This inner liner ensures that the rubber tire will maintain high pressure air for extended use periods. The tire body ply is a calendar to sheet consisting of a layer of rubber a layer of fabric a second layer of rubber and other components that provide strength or run-flat capabilities. Depending on speed and vehicle weight tires can have from 2 to 5 or more ply layers. The tire sidewall is a non-reinforced rubber extruded profile. The sidewall formulation provides abrasion resistance and environmental resistance. The sidewall destabilizes to heat and oxidation. The tire structure includes high-strength steel wire encased in a rubber compound to provide mechanical strength and stability to the tire structure. The apex and bead structure is a triangular extruded profile providing a cushion between the rigid bead and the flexible inner liner and body ply assembly of the tire. Tires typically comprise either a bias or radial ply belt. Such belts typically comprise calendared sheets consisting of rubber layers closely spaced steel cords and additional rubber layers. The belts give the tire strength and resistance while retaining flexibility. The tread is a thick extruded profile that surrounds the tire carcass. Tread compounds include additives to prove or impart wear resistance and traction in addition to resistance to heat and oxidation. Many tires include extruded components that can be formed between, for example, the belt package and the tread to isolate the tread for mechanical wear from steel belts. Such technology can improve the lifetime of the tire by isolating internal tire structures. Tire components are typically made from natural or synthetic rubbers including polyisoprene or other conventional elastomer materials. The elastomers include styrene butadiene copolymers polybutadiene polymers halo-butyl rubbers and others. Tire formulations also comprise carbon black for reinforcement and abrasion characteristics, silica, sulfur cross-linking compounds, vulcanization accelerators activators etc, antioxidants, anti-ozone compounds and textile and steel fabric and fibers.

Tire plant processing is traditionally divided into compounding, component preparation, building and curing.

Compounding is the operation of bringing together all the ingredients required to mix a batch of rubber compound. Each component has a different mix of ingredients according to the properties required for that component. Mixing is the process of applying mechanical work to the ingredients in order to blend them into a homogeneous substance. Internal mixers are often equipped with two counter-rotating rotors in a large housing that shear the rubber charge along with the additives. The mixing is done in three or four stages to incorporate the ingredients in the desired order. The shearing action generates considerable heat, so both rotors and housing are water-cooled to maintain a temperature low enough to assure that vulcanization does not begin.

After mixing the rubber charge is dropped into a chute and fed by an extruding screw into a roller die. Alternatively, the batch can be dropped onto an open rubber mill batchoff system. A mill consists of twin counter-rotating rolls, one serrated, that provide additional mechanical working to the rubber and produce a thick rubber sheet. The sheet is pulled off the rollers in the form of a strip. The strip is cooled, dusted with talc, and laid down into a pallet bin. The ideal compound at this point would have a highly uniform material dispersion; however in practice there is considerable non-uniformity to the dispersion. This is due to several causes, including hot and cold spots in the mixer housing and rotors, excessive rotor clearance, rotor wear, and poorly circulating flow paths. As a result, there can be a little more carbon black here, and a little less there, along with a few clumps of carbon black elsewhere, that are not well mixed with the rubber or the additives.

In tire compounding processes, the down or rubber material is typically added to a mixing apparatus, mixing is initiated and the powdered components are blended into the rubber. We have found that incorporating hollow glass spheres into the rubber alone or with conventional powdered components is difficult. The low density and fine character of the hollow glass along with the difference in surface character between the glass and the rubber prevent the ready incorporation of powder hollow glass spheres into the rubber material. We have found that for uncoated hollow glass spheres that the low density glass with or without other powdered components can be first added to a mixer, followed by the more rubber portion. This order of addition can result in successful incorporation of materials into the rubber formulation. In the instance that conventional compounding techniques are to be followed in manufacturing tire formulations using hollow glass spheres, we have found that conventional processes can be used, surprisingly, if the hollow glass spheres are pretreated with an effective amount of the interface modifier. In such a process, effective amount of the interface modifier comprising is formed in a coating on the surface of the hollow glass spheres. This pre-coating step permits the ready incorporation of glass particles into the rubber formulation alone or in combination with other powdered components.

Components fall into three classes based on manufacturing process—calendaring, extrusion, and bead building. The extruder machine consists of a screw and barrel, screw drive, heaters, and a die. The extruder applies two conditions to the compound: heat and pressure. The extruder screw also provides for additional mixing of the compound through the shearing action of the screw. The compound is pushed through a die, after which the extruded profile is vulcanized in a continuous oven, cooled to terminate the vulcanization process, and either rolled up on a spool or cut to length. Tire treads are often extruded with four components in a quadraplex extruder, one with four screws processing four different compounds, usually a base compound, core compound, tread compound, and wing compound. Extrusion is also used for sidewall profiles and inner liners. The calender is a series of hard pressure rollers at the end of a process. Fabric calenders produce an upper and lower rubber sheet with a layer of fabric in between. Steel calenders do so with steel cords. Calenders are used to produce body plies and belts. A creel room is a facility that houses hundreds of fabric or wire spools that are fed into the calender. Calenders utilize downstream equipment for shearing and splicing calendered components.

Tire building is the process of assembling all the components onto a tire building drum. Tire-building machines (TBM) can be manually operated or fully automatic. Typical TBM operations include the first-stage operation, where inner liner, body plies, and sidewalls are wrapped around the drum, the beads are placed, and the assembly turned up over the bead. In the second stage operation the belt package and tread are applied and the green tire is inflated and shaped. All components require splicing. Inner liner and body plies are spliced with a square-ended overlap. Tread and sidewall are joined with a skived splice, where the joining ends are bevel-cut. Belts are spliced end to end with no overlap. Splices that are too heavy or non-symmetrical will generate defects in force variation, balance, or bulge parameters. Splices that are too light or open can lead to visual defects and in some cases tire failure. The final product of the TBM process is called a green tire, where green refers to the uncured state.

Curing is the process of applying pressure to the green tire in a mold in order to give it its final shape, and applying heat energy to stimulate the chemical reaction between the rubber and other materials. In this process the green tire is automatically transferred onto the lower mold bead seat, a rubber bladder is inserted into the green tire, and the mold closes while the bladder inflates. As the mold closes and is locked, the bladder pressure increases so as to make the green tire flow into the mold, taking on the tread pattern and sidewall lettering engraved into the mold. The bladder is filled with a recirculating heat transfer medium, such as steam, hot water, or inert gas. Temperatures are in the area of 350±40 degrees Fahrenheit with pressures around 350±25 PSI for curing. Passenger tires cure in approximately 15 minutes. At the end of cure the pressure is bled down, the mold opened, and the tire stripped out of the mold. The tire may be placed on a PCI, or post-cure inflator, that will hold the tire fully inflated while it cools. There are two generic curing press types, mechanical and hydraulic. Mechanical presses hold the mold closed via toggle linkages, while hydraulic presses use hydraulic oil as the prime mover for machine motion, and lock the mold with a breech-lock mechanism.

In such a structure, the glass microsphere and rubber elastomer composition of the invention can be used in a variety of the tire components. Preferably the compositions of the invention are used as an internal component for making the tire carcass, sidewall or under tread component.

Conventional rubber tire formulations were prepared containing glass microsphere and made into tire sidewall structures. The interface allows our coatings enable the smooth incorporation of the glass bubbles into the tire formulation and obtained as to reduce weight without compromising structural integrity. Our data is as follows:

Evaluation of Glass Bubbles in a Tire Sidewall Formulation Hollow Glass Bubbles in Tire Sidewall Compounds The standard tire sidewall rubber compound used in these experiments were prepared by and obtained from Continental Carbon Company of Houston, Tex. The hollow glass bubbles, iM30k, were obtained from 3M. The tire sidewall compound was first banded on a two roll mill and then the indicated amount of iM30k, either uncoated or coated, was added and mixed in to form the final compound. The coated iM30k was easiest to mix in the compound compared to the uncoated iM30k. The resulting compounds were evaluated for cure and physical properties according to the ASTM methods below with the results shown in Table 2.

Cure rheology: Tests were run on uncured, compounded samples using an Alpha Technologies Moving Die Rheometer (MDR) Model 2000 in accordance with ASTM D5289-93a at 160 C, no preheat, 12 minutes elapsed time, and a 0.5 degree arc. Both the minimum torque (M(L)) and highest torque attained during a specified period of time when no plateau or maximum torque was obtained (M(H)) were measured. Also measured were the time for the torque to increase 2 units above M(L) ("t(s)2"), the time for the torque to reach a value equal to M(L)+0.5(M(H)−M(L)) ("t'50"), and the time for the torque to reach M(L)+0.9(M(H)−M(L)) ("t'90").

Press-Cure: Sample sheets measuring 150×150×2.0 mm were prepared for physical property determination by pressing at about 6.9 mega Pascal (MPa) for 10 minutes at 160 C, unless otherwise noted.

Physical properties: Tensile Strength at Break, Elongation at Break, and Modulus at various elongations were determined using ASTM D412-92 on samples cut from press-cured sheet with ASTM Die D. Units are reported in MPa.

Hardness: Samples were measured using ASTM D2240-85 Method A with a Type A(2) Shore Durometer. Units are reported in points on the Shore-A scale.

Tear Strength: Tear strength was determined using ASTM D624-00 on samples cut from the press-cured sheet with ASTM Die C. The units are reported in kN/m.

Tire Application

One aspect of the invention relates to a tire having a tire portion having a layer containing a composite formed by combining hollow glass microspheres, a rubber formulation and other conventional tire compounding components. The tire portion typically comprises an internal layer of the tire structure. One important tire structure can comprise is a tire sidewall or a tire tread portion. We have found that the combination of a hollow glass microsphere having a coating of an interfacial modifier, a rubber formulation and conventional tire compounding components can result in a tire with substantial structural integrity but with reduced weight. Enhanced fuel efficiency is often obtained from a variety of wheeled vehicles from physically lighter tires. We have found that an improved tire can contain a tire portion in the tire bead, sidewall or tread portion comprising a layer or a zone or a component of the tire comprising a dispersion of a hollow glass microsphere having an interfacial modifier coating in a tire rubber formulation. The interfacial modifier used in the improved tire formulations of the invention improves the association of the hollow glass microsphere with the rubber compounding formulation. This close association of a physical nature, that does not involve coupling or covalent binding, maximizes the reduced weight while avoiding the desirable properties of the rubber formulation. We have found that reactive or coupling agents that have the capability of forming covalent bonds with the rubber components and the hollow glass microspheres are not desirable since they tend to substantially reduce viscoelastic properties, which in turn can reduce the utility lifetime and other beneficial aspects of the tire.

Tire plant processing is traditionally divided into compounding, component preparation, building and curing. In tire compounding processes, the rubber material is typically added to a mixing apparatus, mixing is initiated and the powdered components are blended into the rubber. We have found that incorporating hollow glass spheres into the rubber alone or with conventional powdered components is difficult. The low density and fine character of the hollow glass along with the difference in surface character between the glass and the rubber prevent the ready incorporation of powder hollow glass spheres into the rubber material. We have found that for uncoated hollow glass spheres that the low density glass with or without other powdered components can be first added to a mixer, followed by the more rubber portion. This order of addition can result in successful incorporation of materials into the rubber formulation. In the instance that conventional compounding techniques are to be followed in manufacturing tire formulations, using hollow glass spheres, we have found that conventional processes can be used, surprisingly, if the hollow glass spheres are pretreated with an effective amount of the interface modifier. In such a process, effective amount of the interface modifier comprising about 0.005 to 8.0 weight percent of the interfacial modifier is formed in a coating on the surface of the hollow glass spheres. This pre-coating step permits the ready incorporation of our particles into the rubber formulation alone or in combination with other powdered components.

In the tire building process, where the various components of tire manufacturing and tire materials are brought together, the glass microsphere and rubber elastomer composition of the invention can be used in a variety of the tire components. Preferably the compositions of the invention are used as an internal component for making the tire carcass, sidewall or under tread component.

Conventional rubber tire formulations were prepared containing glass microsphere and made into tire sidewall structures. The interface allows our coatings enable the smooth incorporation of the glass bubbles into the tire formulation and obtained as to reduce weight without compromising structural integrity.

Internal Mixing Study of the Tire Sidewall Compound Containing Glass Bubbles

Procedure and Test Methods

The standard tire sidewall rubber compound used in these experiments were prepared by and obtained from Continental Carbon Company of Houston, Tex. One compound contained 50 phr carbon black and the other 5 phr. The hollow glass bubbles, iM30k, were obtained from 3M. The tire sidewall compound was first banded on a two roll mill and then the indicated amount of iM30k or 5000, either uncoated or coated, was added and mixed in to form the final compound. The coated iM30k was easiest to mix in the compound compared to the uncoated iM30k. The resulting compounds were evaluated for cure and physical properties according to the ASTM methods below.

Cure rheology: Tests were run on uncured, compounded samples using an Alpha Technologies Moving Die Rheometer (MDR) Model 2000 in accordance with ASTM D5289-93a at 160° C., no preheat, 12 minutes elapsed time, and a 0.5 degree arc. Both the minimum torque (M(L)) and highest torque attained during a specified period of time when no plateau or maximum torque was obtained (M(H)) were measured. Also measured were the time for the torque to increase 2 units above M(L) ("t(s)2"), the time for the torque to reach a value equal to M(L)+0.5(M(H)−M(L)) ("t'50"), and the time for the torque to reach M(L)+0.9(M(H)−M(L)) ("t'90").

Mooney Scorch: Tests were run on uncured, compounded samples in accordance with ASTM D1646-06.

Press-Cure: Sample sheets measuring 150×150×2.0 mm were prepared for physical property determination by pressing at about 6.9 mega Pascal (MPa) for 10 minutes at 160° C.

Physical properties: Tensile Strength at Break, Elongation at Break, and Modulus at various elongations were determined using ASTM D412-92 on samples cut from press-cured sheet with ASTM Die D. Units are reported in MPa.

Hardness: Samples were measured using ASTM D2240-85 Method A with a Type A(2) Shore Durometer. Units are reported in points on the Shore-A scale.

Tear Strength: Tear strength was determined using ASTM D624-00 on samples cut from the press-cured sheet with ASTM Die C. The units are reported in kN/m.

All of the tire sidewall compounds shown in Table 4 were mixed in a standard Farrel laboratory BR banbury. A conventional 2-pass mix was employed. The first pass (with all the ingredients except for the accelerator and sulfur) was discharged at 160° C., while the second pass (with the accelerator and sulfur) was discharged at 100° C. At first a conventional mix, which involves adding the polymer to the banbury and then the dries, did not work when attempting to make the compound containing 60 phr uncoated iM30K. The compound would not come together. An upside down mix, which involves adding the dries to the banbury first and then the polymer, was then tried. Compounds containing 30 and 60 phr of uncoated and IM coated iM30K were mixed using this method. A compound containing 60 phr of IM coated iM30K was also mixed the conventional way and was successful.

Standard Tire Sidewall Formulations Containing Glass Spheres

TABLE 3

| Compound # | 1(a) | 2(b) | 3(b) | 4(b) | 5(b) | 6(a) | 7(c) |
|---|---|---|---|---|---|---|---|
| Ingredient, phr | | | | | | | |
| SVR-3L | 50 | 50 | 50 | 50 | 50 | 50 | 50 |
| Taktene 1203 | 50 | 50 | 50 | 50 | 50 | 50 | 50 |

TABLE 3-continued

| Compound # | 1(a) | 2(b) | 3(b) | 4(b) | 5(b) | 6(a) | 7(c) |
|---|---|---|---|---|---|---|---|
| N330 | 50 | 50 | 50 | 50 | 50 | 50 | 50 |
| iM30K |  | 30 |  | 60 |  |  |  |
| iM30K + 5.4 phr KR 9S |  |  | 32 |  | 63.2 | 63.2 | 63.2 |
| Calsol 510 | 10 | 10 | 10 | 10 | 10 | 10 | 10 |
| Stearic Acid | 2 | 2 | 2 | 2 | 2 | 2 | 2 |
| Sunolite 240 | 1 | 1 | 1 | 1 | 1 | 1 | 1 |
| Santoflex 13 | 4 | 4 | 4 | 4 | 4 | 4 | 4 |
| Wingstay 100 | 1 | 1 | 1 | 1 | 1 | 1 | 1 |
| Zinc Oxide | 3 | 3 | 3 | 3 | 3 | 3 | 3 |
| TBBS | 1 | 1 | 1 | 1 | 1 | 1 | 1 |
| Sulfur | 1.8 | 1.8 | 1.8 | 1.8 | 1.8 | 1.8 | 1.8 |
| Formula Weight | 173.8 | 203.8 | 205.8 | 233.8 | 237 | 237 | 237 |
| Mix Time (1st Pass), mm, ss | 3:22 | 2:10 | 2:15 | 3:10 | 2:00 | 2:40 | NA |
| Power (1st Pass), KWH | 0.410 | 0.296 | 0.338 | 0.305 | 0.258 | 0.267 | NA | a) Conventional Mix   b) upside down mix.   c) iM30K + 6phr KR9S added to AW1 on open mill

| MDR @ 160° C., 0.5° Arc, 100 cpm, for 12 minutes ||||||||
|---|---|---|---|---|---|---|---|
| ML, in-lb | 1.81 | 2.78 | 3.00 | 3.81 | 4.38 | 4.54 | 1.74 |
| MH, in-lb | 13.37 | 18.13 | 18.63 | 20.68 | 22.53 | 22.97 | 15.83 |
| ΔT, in-lb | 11.56 | 15.35 | 15.63 | 16.87 | 18.15 | 18.43 | 14.09 |
| ts2, minutes | 2.94 | 1.95 | 2.19 | 1.72 | 1.97 | 2.00 | 2.60 |
| t'50, minutes | 3.59 | 2.43 | 2.84 | 2.16 | 2.66 | 2.78 | 3.54 |
| t'90, minutes | 5.40 | 3.32 | 4.48 | 2.74 | 4.24 | 4.48 | 5.72 |

| Mooney Scorch MS 1 + 30 @ 121° C. ||||||||
|---|---|---|---|---|---|---|---|
| Initial Viscosity, MU | 23.3 | 56.7 | 51.1 | 56.6 | 61.7 | 61.7 | 30.7 |
| Minimum Viscosity, MU | 14.8 | 27.9 | 28.0 | 30.9 | 37.5 | 39.6 | 19.0 |
| t3, minutes | 30.2 | 20.8 | 23.1 | 18.5 | 20.1 | 20.3 | 30.1 |
| t10, minutes |  | 23.0 | 25.6 | 21.0 | 22.6 | 23.0 |  |
| t18, minutes |  | 24.0 | 26.8 | 22.0 | 23.8 | 24.2 |  |

| Physical Properties after Press Cure for 12 minutes @ 160° C., Die D ||||||||
|---|---|---|---|---|---|---|---|
| Tensile, psi | 3080 | 1662 | 1745 | 1098 | 1092 | 1017 | 763 |
| 50% Modulus, psi | 160 | 175 | 203 | 196 | 223 | 186 | 160 |
| 100% Modulus, psi | 260 | 220 | 242 | 208 | 237 | 197 | 165 |
| 200% Modulus, psi | UN | 408 | 460 | 339 | 371 | 310 | 250 |
| Elongation, % | 510 | 458 | 455 | 405 | 422 | 460 | 425 |
| Shore A2 Hardness | 54 | 59 | 61 | 66 | 69 | 71 | 64 |
| Die C Tear, lbf/in | 320 | 133 | 147 | 100 | 119 | 111 | 101 |
| Density, g/cc | 1.099 | 1.007 | 1.003 | 0.934 | 0.953 | 0.927 | 0.962 |
| Density Reduction, % | — | 8.4 | 8.7 | 15.0 | 13.3 | 15.7 | 12.5 |
| Theo Density (% Breakage) |  | 0.984(12) | 0.983(11) | 0.915(10.6) | 0.915(16.4) | 0.915(6.6) | 0.915(16.6) |

Modified glass bubbles incorporated easier into the compounds than the uncoated glass bubbles as determined by time and power to mix (compare 1a to the other compounds). In addition to benefits in time and power, only interfacially modified glass bubbles could be incorporated into the tire formulations using a conventional mixing method; when unmodified, the glass bubbles had to be mixed via an upside down method. As expected, using an upside down method increased glass breakage. Lastly, adding the glass bubbles with the other ingredients improves the physical properties.

Glass Beads and Hollow Sphere Study

Solid glass beads were acquired. Bead sizes were selected based upon packing theory of solid spherical particles. Ultimate packing behavior of hollow glass spheres is limited by the narrow size distribution of the hollow glass spheres. The beads were interfacially modified and used as a proxy for hollow glass bubbles due to the wider size availability of beads to that of bubbles. In order show increased packing level, two sized solid glass beads were purchased and used to determine powder packing behavior. The results are shown in Table 5 below.

TABLE 5

| Bubble | Bead | G/cc | Size μ | Amount of Each Size | Coating | Amount of Coatng (%) | Packing Density (g/cc) | Packing % |
|---|---|---|---|---|---|---|---|---|
| | 5000 | 2.43 | 11 | 100 | none | 0 | 1.573 | 63 |
| | 5000 | 2.4 | 11 | 100 | IM3 | 1.8 | 1.806 | 75 |
| | 2429 | 2.43 | 85 | 100 | none | 0 | 1.480 | 59 |
| | 2429/5000 | 2.43 | 85/11 | 75/25 | none | 0 | 1.866 | 75 |
| | 2429/5000 | 2.43 | 85/11 | 75/25 | IM1 | 2 | 1.982 | 83 |
| | 2429/5000 | 2.40 | 85/11 | 75/25 | IM3 | 1.8 | 1.951 | 80 |
| iM30K | | 0.60 | 16 | 100 | none | 0 | 0.374 | 62 |
| iM30K | | 0.615 | 16 | 100 | IM3 | 5.4 | 0.422 | 69 |
| iM30K | | 0.605 | 16 | 100 | IM3 | 1.8 | 0.416 | 69 |
| iM30K | | 0.608 | 16 | 100 | IM4 | 3 | 0.406 | 67 |
| iM30K | | 0.615 | 16 | 100 | IM5 | 5.4 | 0.426 | 69 |
| iM30K | | 0.613 | 16 | 100 | IM6 | 4.8 | 0.431 | 70 |

It is clear that the use of the different size glass particles increases packing density. The findings here can be used to increase ultimate glass bubble loading in a continuous phase if different sized hollow glass bubble sizes were made and blended. Further hollow glass bubble loading levels will be attainable that can reduce sidewall specific gravity to levels less than what has been done at this time. Also note the increased packing density of interfacially modified hollow glass spheres over that of unmodified glass bubbles.

Thermal Conductivity within a Thermoplastic

Thermal conductivity testing of hollow glass bubble filled nylon vs. unfilled nylon was conducted. Samples consisted of 50 volume % 3M K1 hollow glass spheres in a H.B. Fuller Co. nylon (polyamide) blend.

Testing was completed on using a Mathis TC-30 thermal conductometer which uses a modified hot wire technique. The unfilled resin sample measured at $0.23+/-0.01$ W-K$^{-1}$ m$^{-1}$. The microsphere-filled sample measured at $0.11+/-0.01$ W-K$^{-1}$ m$^{-1}$. The reduction, from the use of hollow glass spheres in the polymer composite, in thermal conductivity was 52%. Delrin was used as the reference material for a control. The reference was measured at its accepted thermal conductivity value of 0.38 W-K$^{-1}$ m$^{-1}$.

Rheological Benefits of Using Spherical Particles with Irregularly Shaped Particles Additionally, using spherical particles enhanced rheological properties in the composite. Rough particles (TDI tungsten) and smooth particles (Ervin Industries S70 carbon steel) were interfacially modified. The particles were incorporated into a Dyneon PVDF 11008 polymer using three ratios of spherical to rough particles within a 19 mm B&P twin screw compounder. The ratios were (1) all rough; (2) 50/50 volume % spherical: rough or (3) all spherical. For each particle ratio, the volumetric particulate loading level within the polymer phase was systematically increased until over-torque occurred. Melt temperature, torque, and pressure were recorded.

Figure 5:
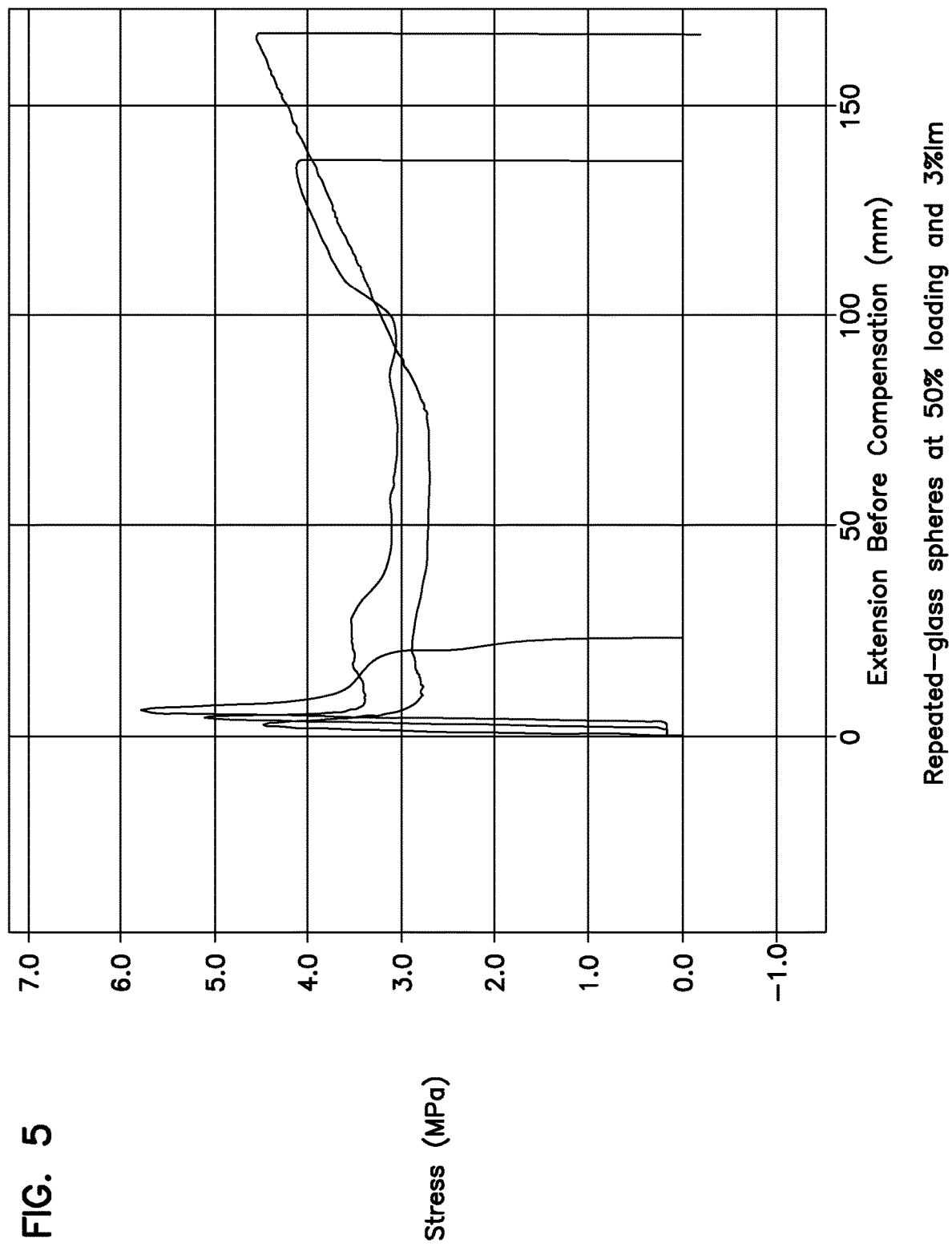

The presence of spherical particles enhanced rheological properties shown in FIG. 5. When comparing rough and the 50/50 blended particles, the spherical particles lowered melt temperature at a given particle loading and also allowed for higher overall particle loadings before over-torque occurred. While compounding entirely spherical particles, the compounder continued to run at all particulate loading levels, without over torque, at all volumetric loading levels evaluated. The enhanced rheological properties of the 50/50 blended particles over that of the spherical particles at loading levels above that where the rough particles over-torqued the machine was unexpected.

The composites of the invention can be used in a number of applications that use either the properties of the particulate in the composite or the overall viscoelastic properties of the composite. The viscoelastic materials can be formed into objects using conventional thermoplastic polymer forming techniques including extrusion, injection molding, compression molding, and others. The composites of the invention can be used in many specific applications such as in transportation (including automotive and aerospace applications), abrasive applications used to either remove materials such as paint or corrosion or dirt or stains, uses where high density (6 to 17 g-cm$^{-3}$) or low density (0.2 to 2 g-cm$^{-3}$) is useful, hunting and fishing applications or in mounting applications where a base or mounting weight is needed. Specific applications include fishing lure and jig, abrasive pads with aluminum oxide, silica or garnet used like sand paper or sanding blocks, abrasive pads with cleaning materials used like Scotchbright® pads for cleaning surfaces, brake pads (aluminum oxide or garnet), apex seals for Wankel® or rotary engines, fuel applications (line, tank or seal), engine or drive train counterweight, automotive or truck wheel weight.

An inorganic hollow glass sphere, ceramic, nonmetal or mineral particle polymer composite can be made comprising the hollow glass and ceramic, inorganic, nonmetal or mineral particle, the majority of the particles having a particle size greater than about 5 microns. We believe an interfacial modifier (IM) is an organic material that provides an exterior coating on the particulate promoting the close association (but with substantially no covalent bonding to the polymer or particle) of polymer and particulate. Minimal amounts of the modifier can be used including about 0.005 to 8 wt.-%, or about 0.02 to 3 wt. %. Such an IM coating can have a thickness of about 0.10 to 1 microns.

The density of the composite can be about 0.2 to 5 gm-cm$^{-3}$, 0.2 to 2 gm-cm$^{-3}$, 0.2 to 0.8 gm-cm$^{-3}$. The composite can comprise a polymer phase and a particle coating comprising an interfacial modifier. The composite has a tensile strength of about 0.1 to 15 times, about 0.1 to 5 times, about 0.2 to 10 times, about 0.3 to 10 times that of the base polymer and a tensile elongation of about 5% and 100% of base polymer and can comprise an inorganic nonmetal particle, the majority of the particles having a particle size of about 5 to 1000 microns in a polymer such as a thermoplastic including a polyolefin (and a HDPE), a PVC, or fluoropolymer phase. The composite can have a tensile strength of greater than about 2 MPa with a particle morphology of the particulate of 1 to $10^6$ and the circularity of the particulate is 12.5 to 25 or 13 to 20. Alternatively, the composite has a tensile strength of greater than about 2 MPa and the non-metal, inorganic or mineral particle comprises a particle morphology of the particulate of 1 to $10^6$ and a circularity of 13 to 20. The composite has a tensile strength of about 0.1 to 10 times that of the base polymer and a tensile elongation of about 10% and 100% of base polymer. The composite has a tensile strength of about 0.1 to 5 time that of the base polymer and a tensile elongation of about 15% and 100% of base polymer. The particle comprises a mineral having a particle size ($P_s$) of about 15 to 1200 microns, a ceramic having a particle size ($P_s$) of greater than about 10 microns, a solid glass sphere having a particle size ($P_s$) of about 15 to 250 microns, a silica sand or zirconium silicate having a particle size ($P_s$) of about 75 to 300 microns, an aluminum oxide, a garnet, or other particulate.

The polymer can comprise a fluoropolymer, a fluoroelastomer, a polyamide, a nylon, a poly (ethylene-co-vinyl acetate), a synthetic rubber, a polyvinyl chloride, a polyolefin (including a high density polyolefin) such as a polyethylene (including a HDPE) a polypropylene or other such polymers or mixtures. The particles can have a coating of about 0.01 to 3 wt % of an interfacial modifier based on the composite. The particles have an excluded vol. of about 13 vol.-% to about 70 vol.-%, or about 13 vol.-% to about 60 vol.-%.

The resulting composite has a thermoplastic shear of at least 5 $sec^{-1}$, a density is less than 0.9 $gm\text{-}cm^{-3}$, a density is about 0.2 to 1.4 $gm\text{-}cm^{-3}$.

In preferred tire formulations the composite comprises a synthetic rubber polymer. The particle comprises a mixture of particles derived from two distinct nonmetallic particulate compositions.

The particle comprises a mixture of at least one nonmetallic particulate composition and at least one metallic particulate composition. The composite particle can comprise a coating of about 0.005 to 8 wt % of an interfacial modifier, based on the composite.

The component can comprise a fishing lure or jig, an abrasive pad, that can be made comprising cleaning materials, a brake pad, a fuel component comprising a line a tank or seal, a drive train counterweight, an automotive, truck, wheel weight.

The composites materials of the invention can comprise a hollow glass microsphere and polymer composite that includes about 30 to 87 volume percent of a hollow glass microsphere having a particle size greater than about 5µ and having a coating of about 0.005 to 5 weight percent of interfacial modifier. The composite also includes a polymer phase, the polymer can have a density of greater than 17 $gm\text{-}cm^{-3}$. The composite can have a composite density that is about 0.4 to 5 $gm\text{-}cm^{-3}$ about 0.4 to 2 $gm\text{-}cm^{-3}$ or about 0.4 to 0.8 $gm\text{-}cm^{-3}$. The composite can have a tensile strength of about 2 to 30 times that of the base polymer, a tensile elongation of about 5% to 100% of the base polymer or about 20% to 100% of the base polymer. Further the composite can have a tensile strength of about 10 to 20 times that of the base polymer in a tensile elongation of about 15% to 90% of the base polymer. When extruded, the composite has a thermoplastic shear of at least about 5 or 15 $sec^{-1}$ and can have a tensile strength of at least about 0.2 or 1.0 Mpa. Additionally the composite can comprise a packing extent that is greater than about 30 volume percent or about 50 volume percent of the composite. The hollow glass microsphere in the composite has a particle size distribution that includes particles having a particle size $P_S$ between about 10 to 1000 microns, alternately about 10 to 300µ and more specifically about 10 to 200. The composite the invention, in combination with a hollow glass microsphere can have a second particulate having a particle size that differs from the microsphere by at least 5 Similarly the composite can have a hollow glass microsphere and a second particle such that the particle size is defined by the formula $P_S \geq 2\ P_S^1$ or $P_S \leq 0.05\ P_S^1$ wherein $P_S$ is the particle size of the hollow glass microsphere and $P_S^1$ is the particle size of the particulate. The composite particulate, apart from the hollow glass microsphere can comprise virtually any other particle having a particle size that ranges from about 10 to about 1000µ. Such particles can include a metallic particulate a solid glass sphere a second hollow glass microsphere, and inorganic mineral, a ceramic particle or mixtures thereof. While hollow glass spheres have a circularity of less than 15 indicating a substantially circular particle, other particulate materials of the invention using the composite can have a circularity showing a rough or amorphous particle character with a circularity greater than 12.5. Polymers used in the compositions of the invention include a variety of thermoplastic materials including a polyamide, such as a nylon, poly (ethylene-co-vinyl acetate), a natural or synthetic rubber, polyvinyl chloride, a fluoro-polymer, or fluoroelastomer. The composite can have a particle with greater than 5 vol-% of a particle having a particle size $P_S$ distribution ranging from about 10 to about 200 microns and greater than 10 vol-% of a particulate in the range of about 5 to 1000 microns. The particles can be a mixture of particles of differing nonmetallic composition. The composite comprises about 0.01 to 4 wt % of an interfacial modifier. The composite additionally comprises an organic or inorganic pigment or an organic fluorescent dye.

A hollow glass microsphere and polymer composite can comprise about 90 to 30 volume-% of a hollow glass microsphere having a density greater than 0.10 $gm\text{-}cm^{-3}$ and less than 5 $gm\text{-}cm^{-3}$ and a particle size greater than 8 microns; and about 10 to 70 volume-% of a polymer phase; wherein the microsphere has a coating comprising about 0.005 to 8 wt.-% of an interfacial modifier; and wherein the composite density is about 0.4 to 15 $gm\text{-}cm^{-3}$. The density can be about 0.4 to 5 $gm\text{-}cm^{-3}$ about 0.4 to 2 $gm\text{-}cm^{-3}$ or about 0.4 to 0.8 $gm\text{-}cm^{-3}$ A shaped article comprising the composite comprises about 87 to 50 vol-% of a hollow glass microsphere, and having a particle size distribution having at least 10 wt.-% of a particulate within about 10 to 100 microns and at least 10 wt.-% of the polymer particulate within about 100 to 500 microns and for certain uses can have a density of about 0.4 to 0.8 $gm\text{-}cm^{-3}$. Such uses include an insulating layer comprising the composite of claim 1 wherein the thermal transfer rate of the composite layer is less than 50% of the thermal transfer rate of a conventional polymer composite layer, a sealant layer that can be used in an insulated glass unit, an acoustically insulating layer having a reduced sound transfer rate, a protective layer having improved impact resistance comprising the composite layer(s) that after impact rebounds a structural member used in a structure assembled using a fastener, wherein the structural member has an improved fastener retention, a barrier layer, acting as a barrier to gas mass transfer, the barrier layer, wherein the permeability of the layer to argon, nitrogen, or a mixed gas having a major proportion of nitrogen is reduced by at least 50%.

The composite can be used in a tire composition or formulation comprising a vulcanizable rubber about 30 to 87 vol % of a hollow glass microsphere having a coating of about 0.005 to 8 wt. % an interfacial modifier. Such composition can be made with a process of compounding a tire rubber formulation, the method comprising adding about 30 to 80 vol % of a hollow glass microsphere having a coating of about 0.005 to 8 wt. % of an interfacial modifier, to a tire formulations compounding mixer containing a un-vulcanized rubber.

While the above specification shows an enabling disclosure of the composite technology of the invention, other embodiments of the invention may be made without departing from the spirit and scope of the invention. Accordingly, the invention is embodied in the claims hereinafter appended.

We claim:

1. A melt processing method of manufacturing a hollow glass microsphere and polymer composite from a mixture, said method comprising:
   (a) pre-treating a hollow glass microsphere with an effective composite forming amount of an interfacial modifier coating; wherein the interfacial modifier is free of a coupling agent; and wherein the hollow glass microsphere has a particle size of at least about 5 microns;
   (b) combining a thermoplastic polymer phase with about 30 to 95 volume % of the pre-treated interfacial modifier coated hollow glass microsphere, in an amount that can substantially occupy excluded volume of a hollow glass microsphere particle distribution in the composite; and
   (c) melt process compounding the mixture to form the composite comprising the pre-treated hollow glass microspheres within the thermoplastic polymer phase; wherein the hollow glass microsphere exhibits a circularity greater than 13 and an aspect ratio less than 1:3; and wherein the interfacial modifier coating allows for greater freedom of movement between the pre-treated hollow glass microsphere within the polymer phase compared to the same composite without the interfacial modifier coating on the hollow glass microsphere, when measured under the same conditions.

2. The method according to claim 1, wherein about 40 to 70 volume % of the hollow glass microsphere composite comprises the thermoplastic polymer phase.

3. The method according to claim 1, wherein the composite comprises about 0.02 to 3 wt.-% of the interfacial modifier.

4. The method of claim 1 wherein the thermoplastic polymer phase has a density of about 0.86 gm-cm$^{-3}$.

5. The method of claim 1, wherein the composite has a density of about 0.4 to 5 gm-cm$^{-3}$.

6. The method of claim 1 wherein the composite additionally comprises a solid particulate or a fiber, the particulate having a particle size ($P_s$) of about 5 to 1000 microns and the fiber having an aspect ratio of greater than 10.

7. The method of claim 1 wherein after compounding, the method includes extruding the composite.

8. The method of claim 1 wherein the thermoplastic polymer phase comprises a polyamide, poly (ethylene-co-vinyl acetate), a synthetic rubber, a polyvinyl chloride, a fluoropolymer, a polyolefin, a thermoset polymer.

9. The method according to claim 1, wherein said melt processing comprises injection molding the composite.

10. The method according to claim 1, wherein said melt processing comprises compression molding the composite.

11. The composite of claim 1 wherein the composite has a tensile strength of about 0.1 to 10 times that of the thermoplastic polymer phase.

12. The composite of claim 1 wherein the composite has a tensile elongation of about 15% to 90% of the thermoplastic polymer phase.

13. The composite of claim 1 wherein the composite has a thermoplastic shear at least about 5 sec$^{-1}$.

14. The composite formulation of claim 1 wherein the composite has a tensile strength of at least 0.2 MPa and a thermoplastic shear of at least 5 sec$^{-1}$.

15. The composite of claim 1 wherein the hollow glass microsphere has a particle size $P_S$ of about 5 to 300 microns.

* * * * *